US012743298B2

(12) United States Patent
Li

(10) Patent No.: US 12,743,298 B2
(45) Date of Patent: Sep. 22, 2026

(54) TRANSACTION PROCESSING METHOD FOR DATABASE SYSTEM, APPARATUS, ELECTRONIC DEVICE, COMPUTER-READABLE STORAGE MEDIUM, AND COMPUTER PROGRAM PRODUCT

(71) Applicant: Tencent Technology (Shenzhen) Company Limited, Shenzhen (CN)

(72) Inventor: Haixiang Li, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 485 days.

(21) Appl. No.: 18/072,629

(22) Filed: Nov. 30, 2022

(65) Prior Publication Data

US 2023/0107958 A1 Apr. 6, 2023

Related U.S. Application Data

(63) Continuation of application No. PCT/CN2022/087848, filed on Apr. 20, 2022.

(30) Foreign Application Priority Data

May 19, 2021 (CN) ......................... 202110546080.0

(51) Int. Cl.
*G06F 9/46* (2006.01)
*G06F 16/23* (2019.01)

(52) U.S. Cl.
CPC .......... *G06F 9/466* (2013.01); *G06F 16/2329* (2019.01); *G06F 16/2365* (2019.01)

(58) Field of Classification Search
CPC .. G06F 9/466; G06F 16/2329; G06F 16/2365; G06F 16/00; G06F 16/22;
(Continued)

(56) References Cited

U.S. PATENT DOCUMENTS

2001/0026678 A1* 10/2001 Nagasaka .............. G11B 27/34 386/243
2010/0162249 A1* 6/2010 Shpeisman ............. G06F 9/466 718/101
(Continued)

FOREIGN PATENT DOCUMENTS

CN 101405735 A 4/2009
CN 107533474 A 1/2018
(Continued)

OTHER PUBLICATIONS

Tencent Technology, Extended European Search Report and Supplementary Search Report, EP22803726.3, Nov. 29, 2023, 53 pgs.
(Continued)

*Primary Examiner* — Ann J Lo
*Assistant Examiner* — Fatima P Mina
(74) *Attorney, Agent, or Firm* — Morgan, Lewis & Bockius LLP

(57) ABSTRACT

An electronic device determines a concurrent transaction of a target transaction. The concurrent transaction and the target transaction include a read and write operation acting on a same variable, and the target transaction is a transaction to be committed. The device obtains a first intersection between a read set of the target transaction and a write set of the concurrent transaction. The device obtains a second intersection between a write set of the target transaction and a read set of the concurrent transaction. When at least one of the first intersection and the second intersection is a non-empty data set and the target transaction conflicts with the concurrent transaction, the device determines, based on a version change count of the same variable on which the target transaction and the concurrent transaction act and a target variable list, a data anomaly type the target variable
(Continued)

list including the same variable on which the target transaction and the concurrent transaction act.

18 Claims, 9 Drawing Sheets

(58) Field of Classification Search
CPC ...... G06F 9/467; G06F 9/4881; G06F 9/5038; G06F 2209/481; G06F 2209/484; G06F 2209/5021
See application file for complete search history.

(56) References Cited

U.S. PATENT DOCUMENTS

| | | | | |
|---|---|---|---|---|
| 2014/0181821 | A1* | 6/2014 | Shavit | G06F 9/528 718/101 |
| 2015/0169356 | A1* | 6/2015 | Nagashima | G06F 9/466 709/203 |
| 2016/0171002 | A1* | 6/2016 | Bendel | G06F 16/219 707/714 |
| 2016/0378541 | A1* | 12/2016 | Busaba | G06F 3/0622 711/130 |
| 2017/0220617 | A1 | 8/2017 | Bortnikov et al. | |
| 2017/0277744 | A1 | 9/2017 | Mohandas et al. | |

FOREIGN PATENT DOCUMENTS

| | | | | |
|---|---|---|---|---|
| CN | 108874587 | A | 11/2018 | |
| CN | 109710388 | A | 5/2019 | |
| CN | 111143389 | A * | 5/2020 | G06F 16/2329 |
| CN | 111209093 | A | 5/2020 | |
| CN | 111444027 | A | 7/2020 | |
| CN | 111708615 | A | 9/2020 | |
| CN | 111736964 | A | 10/2020 | |
| CN | 112069196 | A | 12/2020 | |
| CN | 112148930 | A | 12/2020 | |
| CN | 112231071 | A | 1/2021 | |
| JP | 2015118431 | A | 6/2015 | |
| JP | 2020204975 | A | 12/2020 | |
| JP | 2021051743 | A | 4/2021 | |

OTHER PUBLICATIONS

Tencent Technology, ISR, PCT/CN2022/087848, Jun. 28, 2022, 2 pgs.

Tencent Technology, Japanese Office Action, JP Patent Application No. 2023-521163, May 20, 2024, 10 pgs.

Information Processing Society of Japan, "Read Atomic", Institute of Electronics, Information and Communication Engineers, IEICE Technical Report, vol. 2017-DBS-166, No. 18, Dec. 2017, 6 pgs., https://www.ipsi.or.jp/english/organization/index.html.

Tencent Technology, WO, PCT/CN2022/087848, Jun. 28, 2022, 4 pgs.

Tencent Technology, IPRP, PCT/CN2022/087848, Nov. 21, 2023, 5 pgs.

* cited by examiner

Conflict cycle graph 2-1

TRANSACTION PROCESSING METHOD FOR DATABASE SYSTEM, APPARATUS, ELECTRONIC DEVICE, COMPUTER-READABLE STORAGE MEDIUM, AND COMPUTER PROGRAM PRODUCT

CROSS-REFERENCE TO RELATED APPLICATIONS

This application is a continuation application of PCT Patent Application No. PCT/CN2022/087848, entitled "A DATABASE SYSTEM TRANSACTION PROCESSING METHOD, DEVICE, ELECTRONIC EQUIPMENT, COMPUTER-READABLE STORAGE MEDIUM AND COMPUTER PROGRAM PRODUCTS" filed on Apr. 20, 2022, which claims priority to Chinese Patent Application No. 202110546080.0, filed with the State Intellectual Property Office of the People's Republic of China on May 19, 2021, and entitled "TRANSACTION PROCESSING METHOD FOR DATABASE SYSTEM, APPARATUS, ELECTRONIC DEVICE, COMPUTER-READABLE STORAGE MEDIUM, AND COMPUTER PROGRAM PRODUCT", all of which are incorporated herein by reference in their entirety.

FIELD OF THE TECHNOLOGY

This application relates to the field of database technologies, and in particular, to a transaction processing method for a database system, an apparatus, an electronic device, a computer-readable storage medium, and a computer program product.

BACKGROUND OF THE DISCLOSURE

With the development of database technologies, recognizing data anomalies in a database system has become a key issue. Currently, there are two methods for recognizing a data anomaly. One method is to recognize a data anomaly using a locking technology and depending on a mutual exclusion mechanism of a lock. The other method is to confirm, using a dependency graph technology, whether a cycle exists in a dependency graph formed by concurrent transactions. If a cycle exists, it indicates that data anomaly exists. However, the locking technology limits concurrency of the database system, causing low transaction processing efficiency, and the dependency graph technology needs to traverse each concurrent transaction to recognize existence of a cycle, causing low transaction processing efficiency.

SUMMARY

Embodiments of this application provide a transaction processing method for a database system, an apparatus, an electronic device, a computer-readable storage medium, and a computer program product, to improve transaction processing efficiency of a database system.

An embodiment of this application provides a transaction processing method for a database system, including:

- determining a concurrent transaction of a target transaction, the concurrent transaction and the target transaction include a read-write operation acting on a same variable, and the target transaction is a transaction to be committed;
- obtaining a first intersection between a read set of the target transaction and a write set of the concurrent transaction, and obtaining a second intersection between a write set of the target transaction and a read set of the concurrent transaction; and
- when at least one of the first intersection and the second intersection is a non-empty data set and the target transaction conflicts with the concurrent transaction, determining, based on a version change count of the same variable on which the target transaction and the concurrent transaction act and a target variable list, a data anomaly type, the target variable list including the same variable on which the target transaction and the concurrent transaction act.

An embodiment of this application provides a transaction processing apparatus, including:

- a first determining module, configured to determine a concurrent transaction of a target transaction, a read-write operation acting on a same variable being included between the concurrent transaction and the target transaction, and the target transaction being a to-be-committed transaction;
- a second determining module, configured to obtain a first intersection between a read set of the target transaction and a write set of the concurrent transaction, and obtain a second intersection between a write set of the target transaction and a read set of the concurrent transaction; and determine, based on a version change count of the same variable on which the target transaction and the concurrent transaction act and a target variable list, a data anomaly type when at least one of the first intersection and the second intersection is a non-empty data set and the target transaction conflicts with the concurrent transaction, the target variable list including the same variable on which the target transaction and the concurrent transaction act.

An embodiment of this application provides an electronic device, including a processor and a memory, the memory being configured to store at least one computer program, and the at least one computer program being loaded and executed by the processor, to implement the transaction processing method for a database system provided in the embodiments of this application.

An embodiment of this application provides a non-transitory computer-readable storage medium, storing at least one computer program, and the at least one computer program being loaded and executed by a processor, to implement the transaction processing method for a database system provided in the embodiments of this application.

An embodiment of this application provides a computer program product, including a computer program or instruction, the computer program or instruction, when executed by a processor, implementing the transaction processing method for a database system provided in the embodiments of this application.

The technical solutions provided in the embodiments of this application include at least the following beneficial effects: After a concurrent transaction of a target transaction is determined, when a non-empty data set exists in a first intersection between a read set of the target transaction and a write set of the concurrent transaction and a second intersection between a write set of the target transaction and a read set of the concurrent transaction, whether the target transaction conflicts with the concurrent transaction is determined, and if the target transaction conflicts with the concurrent transaction, a data anomaly type is determined according to the same variable on which the two transactions act and a version change count of the same variable. In this way, in a process of executing the target transaction, whether the target transaction actually conflicts with concurrent transaction can be confirmed, and additionally by determining the data anomaly type through the same variable on which the two transactions act, various data anomalies in a database system can be recognized, to ensure data state consistency, thereby improving transaction processing efficiency of the database system.

BRIEF DESCRIPTION OF THE DRAWINGS

To describe the technical solutions of the embodiments of this application more clearly, the following briefly introduces the accompanying drawings required for describing the embodiments. Apparently, the accompanying drawings in the following description show merely some embodiments of this application, and a person of ordinary skill in the art may still derive other drawings from the accompanying drawings without creative efforts.

FIG. 5 is a flowchart of a transaction processing method according to an embodiment of this application.

DESCRIPTION OF EMBODIMENTS

Figures 1, 2:
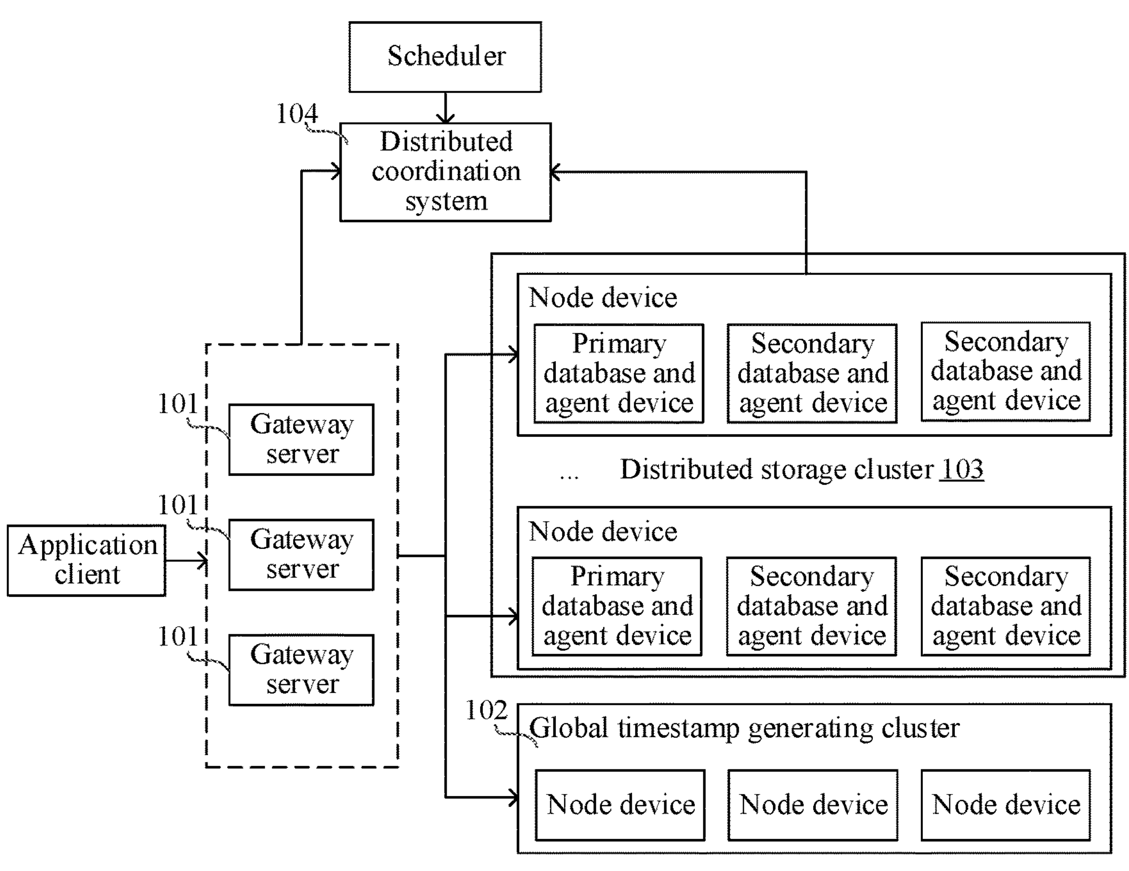
FIG. 1 is a schematic diagram of an implementation environment of a transaction processing method according to an embodiment of this application.
FIG. 2 is a schematic diagram of a conflict cycle graph according to an embodiment of this application.

To make the objectives, technical solutions, and advantages of this application clearer, the following further describes the implementations of this application in detail with reference to the accompanying drawings.

Exemplary embodiments are described in detail herein, and examples thereof are shown in the accompanying drawings. When the following descriptions are made with reference to the accompanying drawings, unless otherwise indicated, the same numbers in different accompanying drawings represent the same or similar elements. The following implementations described in the following exemplary embodiments do not represent all implementations that are consistent with this application. Instead, they are merely examples of apparatuses and methods consistent with aspects related to this application as recited in the appended claims.

The terms "first", "second", and the like in this application are used for distinguishing between same items or similar items of which effects and functions are basically the same. The "first", "second", . . . , and "seventh" do not have a dependency relationship in logic or time sequence, and a quantity and an execution order thereof are not limited. It is to be further understood that, although terms such as "first" and "second" are used to describe various elements in the following description, these elements are not to be limited to these terms.

These terms are merely used for distinguishing one element from another element. For example, a first transaction may be referred to as a second transaction, and similarly, a second transaction may be referred to as a first transaction without departing from the scope of the various examples. Both the first transaction and the second transaction may be transactions, and in some cases, may be separate and different transactions.

"At least one" refers to "one or more". For example, "at least one transaction" may refer to any integral number of transactions, the integral number being greater than or equal to one, for example, one transaction, two transactions, or three transactions. However, "a plurality of" refers to "two or more". For example, "a plurality of transactions" may refer to any integral number of transactions, the integral number being greater than or equal to two, for example, two transactions or three transactions.

Before the embodiments of this application are described, some basic concepts in the field of cloud technologies need to be introduced.

The cloud technology is a hosting technology that unifies a series of resources such as hardware, software, and networks in a wide area network or a local area network to implement computing, storage, processing, and sharing of data, that is, a collective name of a network technology, an information technology, an integration technology, a management platform technology, an application technology, and the like based on an application of a cloud computing business mode, and may form a resource pool, which is used as required, and is flexible and convenient. A transaction processing method for a database system provided in the embodiments of this application (briefly referred to as a transaction processing method below) may be implemented based on the cloud technology.

Cloud storage is a new concept extended and developed from the cloud computing concept. A distributed cloud storage system (briefly referred to as a storage system below) refers to a storage system that gathers a large quantity of various different storage devices (a storage device is also referred to as a storage node) in a network through functions such as a cluster application, a grid technology and a distributed file storage system and through application software or an application interface to work collaboratively and provide data storage and service access functions to the outside jointly. The transaction processing method provided in the embodiments of this application may be applied to the cloud storage, so as to recognize an anomaly in the cloud storage.

A database system is an electronic file cabinet, that is, a place for storing an electronic file. A user may perform operations such as add, query, update, or delete data in the file. The so-called "database system" is a data set that is stored together in a particular manner and can be shared by a plurality of users, has as less redundancy as possible, and is independent of an application program. The transaction processing method provided in the embodiments of this application may be applied to the database system, so as to recognize an anomaly in the database system.

The database system involving the embodiments of this application may be a stand-alone database system, a stand-alone database system focused on transactions, or a stand-alone database system focused on analysis but requiring a transaction processing capability, may generally refer to a non-relational database (Non-relational SQL, NoSQL) system, or may be a distributed database system or a distributed big data processing system. For the distributed database system, when different variables are distributed and stored on different physical nodes, corresponding to a case that two and more variables exist in a data state consistency model, the data state consistency model and a corresponding transaction processing process are both described in detail in subsequent descriptions.

The database system may include at least one node device. A plurality of data tables may be stored in a database of each node device, and each data table may be configured to store one or more data items (also referred to as variable versions). A database of a node device may be any type of distributed database, and may include at least one of a relational database or a non-relational database, for example, a structured query language (SQL) database, a NoSQL, various general new extensible/high-performance databases (NewSQL), and the like, and the type of the database is not limited in the embodiments of this application.

In some embodiments, the transaction processing method may be further applied to a database system based on blockchain technology (briefly referred to as "blockchain system" below), the foregoing blockchain system is essentially a decentralized distributed database system, which keeps ledger data recorded by different node devices on a blockchain consistent through a consensus algorithm, ensures encrypted transfer and tamper-proofness of the ledger data between the different node devices through a password algorithm, extends a ledger function through a script system, and connects the different node devices to each other through network routing.

The blockchain system may include one or more blockchains. A blockchain is a string of data blocks generated through association by using a cryptographic method. Each data block includes information of a batch of network transactions, the information being used for verifying the validity of information of the data block (anti-counterfeiting) and generating a next data block.

A peer-to-peer (P2P) network may be formed between the node devices in the blockchain system. The P2P protocol is an application-layer protocol running over the Transmission Control Protocol (TCP). In the blockchain system, any node device may have the following functions.

(1) Routing: which is a basic function of the node device, and is used for supporting communication between node devices.

(2) Application: which is deployed in a blockchain, and is used for implementing a particular service according to an actual service requirement, recording data related to function implementation to form ledger data, adding a digital signature to the ledger data to indicate a source of task data, and transmitting the ledger data to another node device in the blockchain system, so that the another node device adds the ledger data to a temporary block when successfully verifying a source and integrity of the ledger data. Services implemented by the application may include a wallet, a shared ledger, a smart contract and the like.

(3) Blockchain: including a series of blocks that are consecutive in a chronological order. Once a new block is added to the blockchain, the new block is no longer removed. The block records ledger data committed by the node device in the blockchain system.

In some embodiments, each block may include a hash value of a transaction record stored in the current block (a hash value of the current block) and a hash value of a previous block. Blocks are connected according to hash values to form a blockchain. In addition, the block may further include information such as a timestamp indicating a block generation time.

Because correctness of transaction concurrency control in the database system may be described through consistency and isolation, the consistency and the isolation are explained and described below first before the embodiments of this application are described.

1. Isolation. A transaction isolation level is defined through whether data anomaly can be avoided, and possible involved data anomalies include: (A) dirty read, meaning that a transaction reads a data item that another transaction has not committed; (B) non-repeatable read, meaning that a transaction repeatedly reads a same data item twice but obtains different results; and (C) phantom read, meaning that a transaction perform predicate query (range query) twice in an operation process, and a result of the second time of query includes a data item not occurring in a result of the first time of query or lacks a data item occurring in the result of the first time of query.

Based on being capable of resolving the foregoing three data anomalies A, B and C, the international database standard American National Standards Institute (ANSI) SQL proposes four isolation levels, so as to differentiate the foregoing three known data anomalies A, B and C, so as to improve transaction processing efficiency when some data anomalies are allowed to exist.

Additionally, four isolation levels are further included, and are respectively: (a) read uncommitted: the above three data anomalies A, B and C are allowed to occur; (b) read committed: dirty read is disallowed to occur; (c) repeatable read: dirty read and non-repeatable read are disallowed to occur; and (d) serializable: none of the above three data anomalies A, B and C can occur. It is known that each of the four isolation levels disallows a dirty write anomaly to occur, and the dirty write anomaly means that two uncommitted transactions modify a same data item. Known data anomaly types are few when the ANSI SQL formulates standards, and new data anomalies are found continuously subsequently. In addition to the foregoing several data anomalies, data anomalies further include: a lost update anomaly, a read skew anomaly, a write skew anomaly, a read-write skew anomaly, a sawtooth wave write skew anomaly, a serial-concurrent-phenomenon anomaly, a cross-phenomenon anomaly, a cause-and-effect lost anomaly, a cause-and-effect inversion anomaly, an old read anomaly, a future read anomaly and the like.

2. Consistency. In the database technologies, the term "consistency" may express two meanings, where one meaning is transaction consistency, and the other meaning is distributed consistency.

Transaction consistency of a database is: under an operation of a transaction, a data state of the database is changed from one consistent state to another consistent state. The foregoing "consistent state" refers to a data state that some rules defined by the database system in advance are met, for example, these rules may include constraints, cascades, triggers and any combination thereof (belonging to logical semantics of data); the write skew anomaly violates a constraint between particular data, and the constraint belongs to data consistency limited by user semantics.

A concurrent access control technology in the transaction processing technology for databases is used for finding and resolving problems about whether a data anomaly is caused by a transaction concurrence operation to a data item and how to eliminate the data anomaly, the ANSI SQL proposes four data anomaly and isolation levels, and various concurrent access control algorithms are also developed, for example, a locking-based concurrent access control technology, a timestamp-based concurrent access control technology, a concurrent access control technology based on Multi-Version Concurrency Control (MVCC), a concurrent access control technology based on Optimistic Concurrency Control (OCC) and the like.

Distributed consistency of a database is also referred to as shared data object operation consistency. Distributed consistency is on the system-level, for the entire database system, and means that to ensure that data is kept consistent in the database system, the database system is further required to conform to two characteristics, where one characteristic is serializability, and the other characteristic is recoverability. The serializability is the foregoing serializable isolation level in the isolation, and the serializability ensures correctness of a concurrent operation; while the recoverability means that a committed transaction has not read data written by a transaction that is rolled back (meaning that the dirty read anomaly does not occur), the recoverability ensures that after the transaction is rolled back, the data returns to a previous consistent state, the transaction that is rolled back does not affect consistency of the data, and a consistency state of the database system is recoverable.

It can be known based on the foregoing concepts that consistency and isolation are both closely related to data anomaly, and therefore the data anomaly needs to be recognized and avoided in the database system. The involved database anomalies may include: a dirty read data anomaly, a dirty write data anomaly, a non-repeatable read data anomaly, a phantom read data anomaly, a lost update data anomaly, a read skew data anomaly, a write skew data anomaly, a serial-concurrent-phenomenon data anomaly, a cross-phenomenon data anomaly and the like.

Generally, data anomaly recognition depends on the serializability principle, and two data anomaly recognition policies may be usually used. One policy is to avoid occurrence of a data anomaly using a locking technology and depending on a mutual exclusion mechanism of a lock, for example, the serializability isolation level of each of database systems such as DB2, Informix and MySQL uses the locking technology. The other policy is to confirm, using a dependency graph technology, whether a cycle exists in a dependency graph formed by concurrent transactions, and if a cycle exists, the existence of the cycle needs to be broken, thereby eliminating a potential data anomaly.

However, the locking technology severely limits concurrency of the database system, causes low transaction processing efficiency, and the dependency graph technology needs to traverse each concurrent transaction between concurrent transactions to recognize existence of a cycle, causing low transaction processing efficiency. To recognize whether a cycle exists, an association between a concurrent transaction and an operated data item (that is, variable version) is represented not only in need of various derived algorithms but also in need of a complex data structure, increasing complexity of the database system.

Moreover, to perform transaction processing, a simplified implementation such as a snapshot isolation (SSI) technology for a database (PostgreSQL) based on a dependency graph and a conflict serializability technology (the technology is based on the serializability principle) may be further used. In the SSI technology, a necessary and insufficient condition that may cause a cycle to exist in the dependency graph can be recognized in advance: a transaction has a read-write conflict incoming arc and a read-write conflict outgoing arc; and if any transaction meets the foregoing condition, it is considered that a data anomaly exists.

Additionally, the foregoing data anomaly recognition method further has the following problems.

First, cognition is cut apart and not uniformed: each of the locking technology, the dependency graph technology and the SSI technology cuts each data anomaly recognition manner apart, so that whether the data anomaly recognition manner conforms to each data anomaly can be learned only one by one during data anomaly recognition. That is to say, these different types of data anomalies cannot be recognized or learned at a uniform angle. As a result, cognition thinking for the data anomalies is complex and is not clear or uniform, and the complexity is relatively high.

Second, cognition is limited and not comprehensive: none of the locking technology, the dependency graph technology and the SSI technology can exhaust whether an unknown new data anomaly further exists. When a data anomaly exists, lost is brought to the entire database system. For example, when the database system is located at a non-serializable isolation level, if there is a new data anomaly, a data inconsistency error occurs in the system.

Third, the recognition principle is not precise: serializability is a sufficient and unnecessary condition under which data has an anomaly. In this way, during implementation of the database system, although occurrence of a new data anomaly may be avoided, it is also possible that some situations in which no data anomaly exists are still treated as data anomalies, which is equivalent to making a misjudgment for data anomalies. For example, a variable version X1 is written to and a variable version Y1 is read from a transaction 1, the variable version X1 is read from and the variable version Y1 is written to a transaction 2, the foregoing series of database operations may be recorded as "W1(X1) R2(X1) W2(Y1) R1(Y1) C2 C1", and the series of operations are not serializable, but no data anomaly exists.

In view of this, the embodiments of this application provide a transaction processing method for recognizing a data anomaly and avoiding the data anomaly in a transaction processing process. The disclosed method provides a conflict cycle graph in a general form to define a data anomaly, thereby defining the data anomaly visually while ensuring correctness of defining the data anomaly; and refined classification is performed on data anomalies, which can improve transaction processing efficiency of the database system, and detailed descriptions are made below.

FIG. 1 is a schematic diagram of an implementation environment of a transaction processing method according to an embodiment of this application. Referring to FIG. 1, this embodiment of this application may be applied to a distributed database system of database systems, and the system may include a gateway server 101 (three gateway servers are exemplarily shown), a global timestamp generating cluster 102, a distributed storage cluster 103 and a distributed coordination system 104 (for example, ZooKeeper). The distributed storage cluster 103 may include node devices 1 to m (m is a positive integer greater than or equal to 1), and each node device may be a data node device, or may be a coordination node device.

The gateway server 101 is configured to receive an external read-write request, and distribute a read-write transaction corresponding to the read-write request to the distributed storage cluster 103. For example, after logging in to an application client on a terminal, a user triggers the application client to generate a read-write request, and invokes an application programming interface (API) provided by the distributed database system to transmit the read-write request to the gateway server 101. The API may be an API provided by any relational database system. For example, the API may be a MySQL API.

In some embodiments, the gateway server 101 and any data node device or any coordination node device of the distributed storage cluster 103 may be the same physical machine, that is, a data node device or coordination node device also has functions of the gateway server 101.

The global timestamp generating cluster 102 is configured to generate a global commit timestamp (Global Timestamp, Gts) of a global transaction. The global transaction is also referred to as a distributed transaction and refers to a transaction involving a plurality of data node devices. For example, a global read transaction may involve read of data stored on the plurality of data node devices. In another example, a global write transaction may involve write of data on the plurality of data node devices. The global timestamp generating cluster 102 may be logically considered as a single point, and may also provide services with higher availability through a one-primary and three-secondary (which are one primary device and three secondary devices corresponding to the primary device respectively) architecture, to generate the global commit timestamp in the form of a cluster. When one device in the one-primary and three-secondary architecture is faulty, the global commit timestamp may continue to be generated through another device in the one-primary and three-secondary architecture, thereby preventing a fault of the single point, that is, avoiding a bottleneck problem of the single point.

In this embodiment of this application, the global commit timestamp is a timestamp identifier that is globally unique and is monotonically increasing in the distributed database system, and can be used for indicating an order in which all transactions are globally committed, so as to reflect a true chronological order relationship between the transactions (a total order relationship between the transactions), at least one of a physical clock, a logical clock, a hybrid physical clock or a hybrid logical clock (HLC) may be used for the global commit timestamp, and the type of the global commit timestamp is not limited in this embodiment of this application.

Exemplarily, the global commit timestamp may be generated using the hybrid physical clock, the global commit timestamp may be formed by eight bytes, each byte includes eight bits, and there are a total of 64 bits. The first 44 bits may be a value of a physical timestamp (that is, Unix timestamp, precise to milliseconds), may represent a total of $2^{44}$ unsigned integers, and therefore may theoretically represent a physical timestamp of a total of about $$557.8\left(\frac{2^{44}}{1000*60*60*24*365}=557.8\right)$$

years. The last 20 bits may be a monotonically increasing count in a millisecond. In this way, each millisecond includes $2^{20}$ (about 1 million) counts. Based on the foregoing data structure, if a transaction throughput of a stand-alone device (any data node device) is 10 w/s, the distributed storage cluster 103 including 10 thousand node devices may be theoretically supported. Moreover, the quantity of global commit timestamps represents a total quantity of transactions that the system can theoretically support. Based on the foregoing data structure, the system may theoretically support $(2^{44}-1)*2^{20}$ transactions. A method for defining a global commit timestamp is exemplarily described. According to different service requirements, the quantity of bits of the global commit timestamp may be extended, so as to meet supporting of a larger quantity of nodes and a larger quantity of transaction processing. The method for defining a global commit timestamp is not limited in this embodiment of this application.

In some embodiments, the global timestamp generating cluster 102 may be physically independent, or may be merged together with the distributed coordination system 104.

The distributed storage cluster 103 may include a data node device and a coordination node device. Each coordination node device may correspond to at least one data node device, and the data node device and the coordination node device are divided based on different transactions. Using a global transaction as an example, an initiating node of the global transaction may be referred to as a coordination node device, other node devices that the global transaction involves are referred to as data node devices. The number of data node devices or coordination node devices may be one or more, and the number of data node devices or coordination node devices in the distributed storage cluster 103 is not limited in this embodiment of this application. Because the distributed database system provided in this embodiment of this application lacks a global transaction manager, a distributed transaction specification (eXtended Architecture, XA)/two-phase commit (2PC) technology of an organization may be used in the system to support a cross-node transaction (global transaction), to ensure atomicity and consistency of data during a cross-node write operation. In this case, the coordination node device is equivalent to a coordinator in the 2PC algorithm, and each data node device corresponding to the coordination node device is equivalent to a participant in the 2PC algorithm.

In this embodiment of this application, each data node device or coordination node device may be a stand-alone device, or may use a primary-secondary structure (that is, a one-primary and multiple-secondary cluster). As shown in FIG. 1, a schematic description is made using an example in which a node device (data node device or coordination node device) is a one-primary and two-secondary cluster, each node device includes one primary device and two secondary devices, each primary device or secondary device is correspondingly configured with an agent device, and the agent device may be a physical device different from the primary device or secondary device. Certainly, the agent device may alternatively be used as an agent module on the primary device or secondary device. Using a node device 1 as an example, the node device 1 includes one primary database and agent device (primary Database+Agent, briefly referred to as primary DB+Agent), and further includes two secondary database and agent devices (secondary Database+Agent, briefly referred to as secondary DB+Agent).

Exemplarily, a database instance set of a primary device or secondary device corresponding to each node device is referred to as a SET. For example, assuming that a node device is a stand-alone device, a SET of the node device is only database instances of the stand-alone device. If a node device is a cluster with one primary device and two secondary devices, a SET of the node device may be a set of database instances of the primary device and database instances of the two secondary devices. In this case, consistency between data in the primary device and replicated data in the secondary devices may be ensured based on a strong synchronization technology of a cloud database. Linear capacity expansion may be performed on each SET, to meet service processing requirements in the big data scenario. In some financial service scenarios, a global transaction usually refers to cross-SET transfer.

The distributed coordination system 104 may be configured to manage at least one of the gateway server 101, the global timestamp generating cluster 102 or the distributed storage cluster 103. In this embodiment of this application, the distributed coordination system 104 may be accessed through a scheduler on the terminal, thereby controlling the back-end distributed coordination system 104 based on the front-end scheduler, to manage each cluster or server. For example, ZooKeeper may be controlled through the scheduler to delete a node device from the distributed storage cluster 103, that is, make the node device be out of service.

The foregoing FIG. 1 provides a diagram of a lightweight global transaction processing architecture, which is a distributed database system. The entire distributed database system may be considered as a jointly maintained logical data table, data stored in the data table is dispersed to node devices in the distributed storage cluster 103 through a primary key, and data stored on each node device is independent of other node devices, thereby implementing horizontal partitioning on the logical data table by the node devices. Because in the foregoing system, each data table in each database can be horizontally partitioned and then stored in a distributed manner, this system may also be referred to as an architecture with "sharding".

In the foregoing distributed database system, atomicity and consistency of data during a write operation have been implemented based on the XA/2PC technology, and the distributed sharding architecture shown in FIG. 1 is a local transaction manager rather than a global transaction manager. Therefore, the problem of data inconsistency during a read operation still exists. The transaction processing method provided in this embodiment of this application can implement distributed transaction processing, and by constructing a lightweight and decentralized distributed transaction processing mechanism, the distributed database system can be provided with capabilities such as horizontal extension and the like, to expand the application range of the distributed database system, and then problems of atomicity and consistency of data during a write operation and consistency of data during a read operation can be resolved, thereby improving transaction processing efficiency.

The transaction processing method provided in this embodiment of this application may be applied to the foregoing distributed database system using the sharding architecture. For example, the distributed database system is a distributed transactional database system, and certainly may alternatively be a distributed relational database system. Moreover, the transaction processing method provided in this embodiment of this application may also be applied to some stand-alone database systems. When the transaction processing method provided in this embodiment of this application is applied to the distributed database system, distributed transaction processing can be implemented, and transaction processing efficiency can be improved through flexible isolation levels.

In some embodiments, the distributed database system formed the gateway server 101, the global timestamp generating cluster 102, the distributed storage cluster 103 and the distributed coordination system 104 may be considered as a server providing a data service to a user terminal. The server may be an independent physical server, or may be a server cluster or a distributed system formed by a plurality of physical servers, or may be a cloud server that provides basic cloud computing services such as a cloud service, a cloud database, cloud computing, a cloud function, cloud storage, a network service, cloud communication, a middleware service, a domain name service, a security service, a content delivery network (CDN), big data, and an AI platform. The foregoing user terminal may be a smartphone, a tablet computer, a notebook computer, a desktop computer, a smart speaker, a smartwatch, or the like, but is not limited thereto. The terminal and the server may be directly or indirectly connected in a wired or wireless communication manner. This is not limited in this application.

Some basic terms and symbolic representations involved in the database system are described below.

Transaction: it is a logical unit in a process that a database management system executes an operation, is formed by a limited database operation sequence, and is a minimum execution unit of an operation of the database system.

Variable: a transaction is a data unit in a database relationship system, and a variable is an actor operated by a database (or operated data object). In some embodiments, a variable is also referred to as a data item. A variable may be a tuple or record, or may be a page or a table object. A variable may include several variable versions (briefly referred to as "version"). Whenever a transaction updates a variable, a new variable version is added, a natural number may be used as a version number identifier of each variable version of a variable, and a larger version number indicates a newer variable version.

Operation: one database operation is formed by three parts: an operation type, a transaction and a variable version, where operation types may include read (R) and write (W). For example, a transaction $T_i$ reads a variable x, to generate a new version $x_m$ of the variable x, and the foregoing read operation may be recorded as $R_i[x_m]$; and in another example, a transaction $T_j$ updates a variable y, to generate a new version $y_n$ of the variable y, and the foregoing write operation may be recorded as $W_j[y_n]$, where i and j are natural numbers and are respectively numbers of transactions to which corresponding operations belong, and m and n are natural numbers and are respectively version numbers of corresponding variables. Additionally, when R and W do not need to be differentiated, an operation may alternatively be represented with O.

Serializability: serializability is a schedule, and may alternatively be understood as an execution manner between a plurality of transactions. The plurality of transactions are executed in order, and if there is no variable jointly operated between the transactions, it does not matter that the transactions are executed in reverse order. But, if there is a variable jointly operated between the transactions, the order of executing the transactions needs to be fixed. For a plurality of concurrently executed transactions having a jointly operated variable, if an execution result thereof is "equivalent" to a "serialized schedule", the schedule is a "serializable schedule". If the "serializable schedule" is met, a serializability attribute is possessed. Therefore, serializability ensures that the order of executing the plurality of concurrent transactions does not affect consistency of data.

Each transaction in the database system owns two transaction data sets, which are respectively a write set of the transaction and a read set of the transaction, whose meanings are: the write set DSW(T) is configured to store a new data version written by the transaction T, and the read set DSR(T) is configured to store a data version read by the transaction T.

The transaction processing method provided in this embodiment of this application is running based on a data state consistency model (which may be alternatively briefly referred to as "data state model"). In this embodiment of this application, based on the conflict serializability theory, data anomalies are uniformed, and a conflict cycle graph in a general form is provided, and used for representing an association between transactions and variables on which a read-write operation corresponding to the transactions acts. Basic concepts involved in this application are described below.

1. Schedule. A schedule refers to a sequence formed by a plurality of operations of a group of transactions, and is recorded as s. All transactions in a schedule s are recorded as TS(s), all operations in a schedule s are recorded as O(s), and all sets with version number identifier variables in a schedule s are recorded as VS(s). For example, a schedule $s=R_1[x_0]\ R_2[y_0]\ W_3[x_1]\ W_4[y_1]\ R_2[x_1]\ R_1[y_1]$ represents that an operation sequence of the schedule s comes from four transactions, that is, TS $\{T_1, T_2, T_3, T_4\}$, and involves two variables x and y, and each of the variables x and y has two versions.

Schematically, if operations of each of any two transactions in a schedule s are adjacent with a transaction as the unit, that is, a transaction is executed after all operations of a previous transaction are executed, the schedule s is referred to as a serial schedule. For example, a serial schedule s is represented as $s=R_1[x_0]\ R_1[y_0]\ R_2[y_0]\ R_2[x_0]\ W_3[x_1]\ W_4[y_1]$.

2. Conflict. A conflict is also referred to as a conflict operation. When two operations meet the following three conditions, the two operations are referred to as conflict operations. The three conditions are: 1) the two operations belong to different transactions; 2) at least one operation is a write operation; and 3) the two operations operate a same object (read a same object or write a same object). In this embodiment of this application, an object is also referred to as a variable.

Schematically, it is assumed that $O_i[x_m]\ O_j[x_n]$ ($i \neq j$, $m<n$) are operations of two transaction in a schedule s, and are respectively two operations of transactions $T_i$ and $T_j$ acting on a same variable x. If $O_i[x_m]\ O_j[x_n]$ belongs to any one of three conflicts $R_i[x_m]\ W_j[x_{m+1}]$, $W_i[x_m]\ R_j[x_m]$ and $W_i[x_m]\ W_j[x_{m+1}]$, $O_i[x_m]\ O_j[x_n]$ is referred to as a conflict, the conflicts form a skew relationship between $O_i$ and $O_j$, and a set including all conflicts in the schedule s is recorded as conf(s). In this embodiment of this application, the foregoing three conflicts may be sequentially briefly written as RW, WR and WW respectively.

3. Conflict equivalence. If different schedules s and s' meet the following two conditions, s and s' are referred to as conflict equivalence. The two conditions are: 1) the schedules s and s' include a same transaction set, that is, an order of operations in each transaction is fixed, and cannot be changed under different schedules; and 2) the schedules s and s' include the same conflict set.

Schematically, for different schedules s and s', if O(s)=O(s'), and conf(s)=conf(s'), s and s' are referred to as conflict equivalence, and recorded as s≈s'.

For example, the following are two schedules in conflict equivalence.

$$s=R_1[x_0]R_1[y_0]W_2[x_1]W_1[y_1]R_2[z_0]W_1[x_2]W_2[y_2];\text{ and}$$

$$s'=R_1[y_0]R_1[x_0]W_1[y_1]W_2[x_1]W_1[x_2]R_2[z_0]W_2[y_2].$$

4. Conflict serializability. If a serialized schedule s' exists for a schedule s, to cause the two schedules to be conflict equivalence (that is, meet s≈s'), s is referred to as a conflict serializability schedule.

5. Conflict cycle graph (CCG). Schematically, there are a plurality of transactions $t \in TS(s)$ in a schedule s, and if a graph formed by a plurality of transactions t meets the following three conditions, the cycle graph is referred to as a conflict cycle graph, where CCG(s)=(V, E). The three conditions are described below.

1) V=VS(s), which is represented as a vertex set of a CCG graph, elements in the vertex set are referred to as vertices, and a vertex corresponds to a transaction, where a vertex $T_i$ meets $T_i \in TS(s)$.

2) E is a subset of V×V, and may also be referred to as an edge set. Elements in the edge set are referred to as directed edges recorded as $<T_i, T_j>$, and may alternatively be briefly referred to as edges, where $<T_i, T_j> \in E \Leftrightarrow i \neq j\ \Lambda(\exists O_i \in T_i)\ (\exists O_j \in T_j)\ (O_i, O_j) \in conf(s)$. Therefore, a directed edge may alternatively be recorded as being in a form similar to that of the foregoing "conflict". For example, a directed edge is recorded as $W_i[x_m]W_j[x_{m+1}]$. This is not limited in this embodiment of this application.

3) if $<T_i, T_j> \in E$, $<T_j, T_k> \in E$, . . . $<T_p, T_i> \in E$, $i \neq j \neq k \neq \ldots \neq p$, the CCG graph is a graph formed by a directed cycle.

For example, reference is made to FIG. 2. FIG. 2 is a schematic diagram of a conflict cycle graph according to an embodiment of this application. As shown in FIGS. 2, $T_1$ and $T_2$ in the diagram are respectively vertices of the conflict cycle graph 2-1 $T_1$ and $T_2$ are connected to each other through two edges to form the conflict cycle graph, where the two edges are respectively represented as $R_1[x_0]\ W_2[x_1]$ and $W_2[x_1]\ R_1[x_1]$.

In this embodiment of this application, based on the conflict cycle graph, the following three conclusions are obtained, and respectively described below.

1) One conflict cycle graph has at least two edges.

Schematically, if the conflict cycle graph has only one edge, only two transactions exist in the conflict cycle graph, and the two transactions are serial transactions, so that no directed cycle is formed; and if two edges form a directed cycle, for example, a first edge in the conflict cycle graph causes $T_i$ to first occur before $T_j$ and a second edge in the conflict cycle graph causes $T_j$ to first occur before $T_i$, that is, there is no equivalent serializability schedule, the two transactions $T_i$ and $T_j$ conflict with each other.

2) One conflict cycle graph has at most countless edges.

Schematically, countless transactions may exist in TS(s) corresponding to a schedule s. Correspondingly, a conflict cycle graph may include countless vertices, that is, may include countless edges.

3) If any edge is removed from a conflict cycle graph, no cycle is formed again.

Schematically, it is learned according to the third condition of the foregoing conflict cycle graph that, in the directed cycle formed by the conflict cycle graph, there is $i \neq j \neq k \neq \ldots \neq p$, that is, any two edges are different. Therefore, if any edge is removed from a conflict cycle graph, no cycle is formed again.

6. Conflict consistency state graph (CCSG). Schematically, there are a plurality of transactions $t \in TS(s)$ in a schedules, and if a graph formed by a plurality of transactions t meets the following four conditions, the graph is referred to as a conflict consistency state graph, where CCSG(s)=(V, E). The four conditions are described respectively below.

1) The definition of the schedules in the CCSG graph meets the definition of the schedule s in the foregoing CCG graph, that is, CCG(s) and CCSG(s) may be equivalently transformed into each other.

2) For CCSG(s), V=VS(s) is referred to as a vertex set of the CCSG graph, whose elements are referred to as vertices, a vertex $v_i$ meets $v_i \in VS(s)$, and the vertex is formed by two types of data, where one type of data is a transaction identifier (ID), and the other type of data is a list, the list being used for storing different versions of a variable.

3) E is a subset of V×V, and may also be referred to as an edge set, and elements in the edge set are referred to as directed edges. In the CCSG graph, edges are divided into the following two types of edges, the following two types of edges are uniformly expressed as $<V_i, V_j>$, and such edges are derived from equivalent deformation of edges of the CCG graph, and therefore belong to deformation of conflict operations. The two types of edges are described respectively below.

A first type of edge is a consistency state edge, which is recorded as $<x_m, y_n>$ and briefly referred to as a transaction edge $E_T$. The type of edge includes operations of a same transaction, and therefore a data state within the transaction meets a consistency requirement, where x=y and m≠n; or x≠y. Because the CCSG graph is equivalent to the CCG graph, a consistency state edge may alternatively be represented as $R_i[x_m]R_i[y_n]$, and $E_T$ may be used as a label of the edge.

A second type of edge is a state transition edge, which is recorded as $<x_i, x_{i+1}>$ and briefly referred to as a state edge $E_S$. The type of edge is formed by transition of a data state caused by a write transaction by writing a variable, and therefore a version of the variable is changed. Because the CCSG graph is equivalent to the CCG graph, a consistency state edge may alternatively be represented as $W_j[x_{m+1}]$.

4) $\exists V_1 \in V, V_2 \in V, \ldots, V_k \in V$, and $\exists E_1 \in E, E_2 \in E, \ldots E_k \in E$, so that the CCSG graph is a graph formed by a directed cycle. That is, $V_1 \to E_1 \to V_2 \to E_2 \ldots V_k \to E_k \to V_1$ is a graph formed by a directed cycle.

7. Equivalent transformation rules of transforming the CCG graph into the CCSG graph, where the following four equivalent transformation rules of transforming the CCG graph to the CCSG graph are included, and are respectively described below.

A first rule is edge splitting. Any edge of the CCG graph is formed by two operations, that is, one conflict, and may be split into two separate edges. Schematically, the following three edge splitting manners are included, an edge is split into two sub-edges in each manner, and the three splitting manners are described below.

1) For example, an edge is represented as $R_1[x_0]$ $W_2[x_1]$, the edge is split, to obtain $R_1[x_0]$ and $W_2[x_1]$, and moreover two versions $x_0$ and $x_1$ of a variable x are obtained.

2) For example, an edge is represented as $W_2[y_1]R_3[y_1]$, the edge is split, to obtain $W_2[y_1]$ and $R_3[y_1]$, and moreover a version $y_1$ of a variable y is obtained.

3) For example, an edge is represented as $W_3[z_1]$ $W_1[z_2]$, the edge is split, to obtain $W_3[z_1]$ and $W_1[z_2]$, and moreover two versions $z_1$ and $z_2$ of a variable z are obtained.

A second rule is vertex transformation. A version of a variable is used as a vertex of the CCSG graph, that is, a version of a previous step is transformed into a vertex; and using vertices obtained by the example of the foregoing first rule as an example, vertices of the CCSG graph include $x_0$, $x_1$, $y_1$, $z_1$ and $z_2$. A plurality of versions of a same variable are arranged in a longitudinal direction, and versions of different variables on which a same transaction acts are arranged in a transverse direction, where the longitudinal direction may refer to a horizontal direction corresponding to information displayed on a screen, or may refer to a direction perpendicular to the horizontal direction corresponding to the information displayed on the screen or may refer to another direction, and is not limited in this embodiment of this application; but the arrangement direction of the plurality of versions of the same variable is opposite to the arrangement direction of the versions of the different variables on which the same transaction acts. A manner of arranging vertices is not particularly required. In some embodiments, the vertices may be alternatively arranged in another arrangement manner. This is not limited in this embodiment of this application.

A third rule is adding an edge between vertices corresponding to a same variable in adjacent versions. A transition relationship between new vertices obtained by the foregoing second rule is used as a new edge of the CCSG graph. For example, if related sub-edges of the foregoing transaction $T_2$ include: $W_2[x_1]$ and $W_2[y_1]$, $x_1$ and $y_1$ are horizontally juxtaposed, so that an edge $W_2[x_1]$ exists between $x_0$ and $x_1$.

A fourth rule is adding an edge between vertices corresponding to variables on which a same transaction acts. In a same transaction, a consistency state edge of the CCSG graph is constructed. For example, the foregoing vertices continue to be used as an example, and an edge is added between $x_1$ and $y_1$, and a label of the edge is the transaction $T_2$.

8. Equivalent transformation rules of transforming the CCSG graph into the CCG graph, where the following three equivalent transformation rules of transforming the CCSG graph to the CCG graph are mainly included, and are respectively described below.

A first rule is vertex merging. For the CCSG graph, variables operated by a same transaction are merged into a vertex, and the vertex is named a transaction identifier of the transaction, and a representation manner of the vertex is equivalent to a vertex representation manner of the foregoing CCG graph, and is not repeatedly described herein again.

A second rule is adding an edge between adjacent vertices; and includes the following two points, where a first point is reserving state transition of a variable. For example, it can be known from an edge $R_1[x_0]$ $W_2[x_1]$ that, state transition of the variable points from $T_1$ to $T_2$, and therefore a new added edge is $T_1 \to T_2$. A second point is that if no write operation occurs, a new edge is constructed according to a conflict relationship occurring in the original CCG graph. The rule is applied to a case that a WR conflict relationship exists. In the case that a WR conflict relationship exists, a corresponding edge points from a transaction at which W is located to a transaction at which R is located.

A third rule is that the obtained CCG graph includes a cycle, and a directed attribute thereof may be ignored, that is, the CCG graph obtained by transforming the CCSG is an undirected cyclic graph.

In some embodiments of this application, the CCSG graph is the foundation of the data state consistency model. That is, a graph formed by using versions of a variable as vertices and using a read-write operation of a transaction as a state transition edge or using a consistency state edge of a transaction as an edge is the data state consistency model. In the data state consistency model, if a cycle exists, a data anomaly exists, and if no cycle exists, no data anomaly exists.

9. Data anomaly (DA). If a sub-schedule s', that is, $\exists$ s' $\subseteq$ s exists in a schedule s, and a conflict cycle graph exists in s', it is considered that a data anomaly exists in the schedule s, and s' is a specific data anomaly.

Additionally, based on the foregoing conflict cycle graph and data anomaly, the following three conclusions are obtained, and respectively described below.

1) There are countless data anomalies. It is learned based on the second conclusion in the conflict cycle graph that, the conflict cycle graph may include countless vertices and countless edges, and therefore there are countless data anomalies.

2) There are countless sub-classified data anomalies. If vertices in the conflict cycle graph are different, data anomalies are different. If edges in the conflict cycle graph are different, data anomalies are different. If the number of vertices and at least one type of edges in the conflict cycle graph are different, data anomalies are different. Therefore, there are countless sub-classified data anomalies.

3) A formalized expression is used for expressing each sub-classified data anomaly, and the sub-classified data anomaly is named.

It is to be understood that, a data anomaly is a subset of a schedule s correspondingly existing in the conflict cycle graph, and therefore a data anomaly in a fine granularity may be represented by an expression of the subset part of the schedule s forming the conflict cycle graph.

Figure 3:
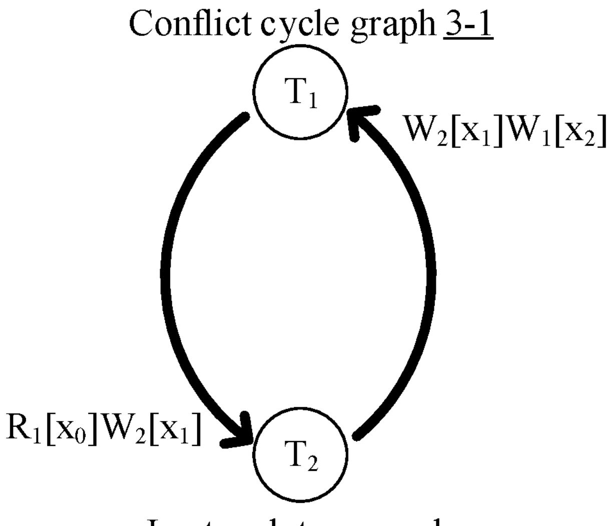
FIG. 3 is a schematic diagram of another conflict cycle graph according to an embodiment of this application.

For example, using a lost update anomaly as an example, for a conflict cycle graph corresponding to the lost update anomaly, reference is made to FIG. 3. FIG. 3 is a schematic diagram of another conflict cycle graph according to an embodiment of this application. As shown in FIG. 3, in the conflict cycle graph 3-1, V={$T_1$, $T_2$}, E={<$R_1[x_0]$ $W_2[x_1]$>, <$W_2[x_1]$ $W_1[x_2]$>}, and then a formalized definition of the lost update anomaly is $R_i[x_m]W_j[x_{m+1}]$ . . . $W_i[x_{m+2}]$.

Figure 4:
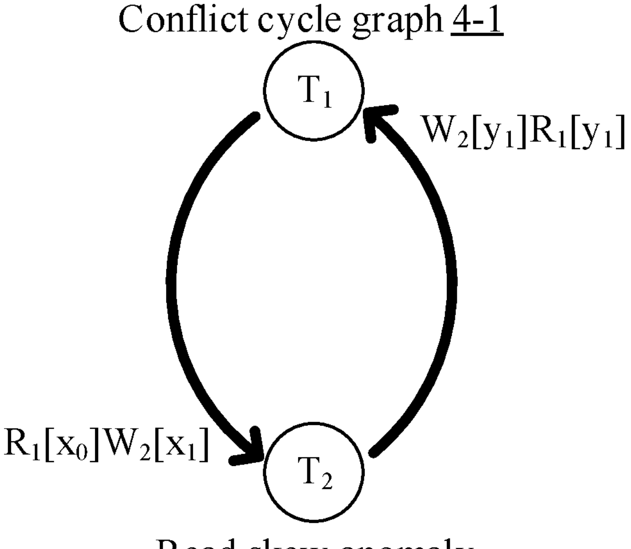
FIG. 4 is a schematic diagram of still another conflict cycle graph according to an embodiment of this application.

In another example, using a read skew anomaly as an example, for a conflict cycle graph corresponding to the read skew anomaly, reference is made to FIG. 4. FIG. 4 is a schematic diagram of still another conflict cycle graph according to an embodiment of this application. As shown in FIG. 4, in the conflict cycle graph 4-1, V={$T_1$, $T_2$}, E={<$R_1[x_0]$ $W_2[x_1]$>, <$W_2[y_1]$ $R_1[y_1]$>}, and then a formalized definition of the read skew anomaly is $R_1[x_m]$ . . . $W_j[x_{m+1}]$ . . . $W_j[y_n]$ . . . $R_i[y_n]$.

Using the foregoing two data anomalies as an example, with reference to the corresponding conflict cycle graph, formalization of the data anomalies is exemplarily described, and conflict cycle graphs corresponding to other data anomalies and formalized definitions of the data anomalies are subsequently described.

10. Rollback rate. When a locking technology is used to suppress concurrence and avoid generating a data anomaly, a transaction that may be originally committed is rolled back, that is, false rollback. Information about rollback involved in this embodiment of this application is respectively described below.

1). Data anomaly rollback. For a schedule s, rollback of a transaction caused because a data anomaly occurs is referred to as data anomaly rollback, and is also referred to as true rollback (TR).

2). Algorithm rollback. For a schedule s, when no data anomaly exists, transaction rollback caused when it is determined through a concurrent access algorithm that data inconsistency may occur is referred to as algorithm rollback, and is also referred to as false rollback (FR).

3). True rollback rate. If true rollback exists in each of U schedules of P schedules, U/P is referred to as a true rollback rate. The true rollback rate reflects a probability that a data anomaly occurs under an application background.

4). False rollback rate. If false rollback exists in each of V schedules of P schedules, V/P is referred to as a false rollback rate. The false rollback rate reflects a concurrent execution capability of a concurrent transaction. A lower false rollback rate indicates higher concurrency, higher utilization of computing resources, and higher transaction concurrence efficiency.

The basic concepts involved in the embodiments of this application are described above, and a transaction processing method of this application is described below. In this embodiment of this application, using the foregoing basic concepts as the theoretical foundation, a conflict cycle graph formed between transactions is used to recognize a data anomaly, which can effectively recognize a data anomaly occurring in a transaction during execution, thereby improving transaction processing efficiency.

With reference to Table 1, Table 1 describes some symbols and corresponding meanings involved in the embodiments of this application.

TABLE 1

| Symbol | Meaning |
| --- | --- |
| CCG | Conflict-based directed cycle graph, also referred to as a conflict cycle graph |
| s | A schedule |
| s ≈ s' | Two schedules s and s' in conflict equivalence |
| TS(s) | Set of transactions in the schedule s |
| VS(s) | Set of a version number identifier variable carried in the schedule s |
| O(s) | Set of operations of a schedule |
| $O_i[x_m]O_j[x_n]$ | Two operations on a same variable x on which transactions $T_i$ and $T_j$ act is referred to as a conflict, where a special example may be expressed as $R_i[x]W_j[x]$ |
| $O_iO_j - O_jO_i$ | A combination of two conflicts forms a cycle, is a necessary condition of forming a data anomaly and is also a formalized expression of the data anomaly |
| $x_m$ | $m^{th}$ version value of a variable x |
| $R_i[x_m]$ | Read operation R of a transaction $T_i$ reads the $m^{th}$ version value of the variable x |
| $W_i[x_m]$ | Write operation W of the transaction $T_i$ writes the $m^{th}$ version value of the variable x |
| RW/WR/WW | Abbreviation forms of three conflicts |
| $R_i[x_m]$ . . . $W_j[x_{m+1}]$ . . . $W_i[y_n]$ . . . $R_i[y_n]$ | Formalized expression of a (read skew) data anomaly |

Figure 5:
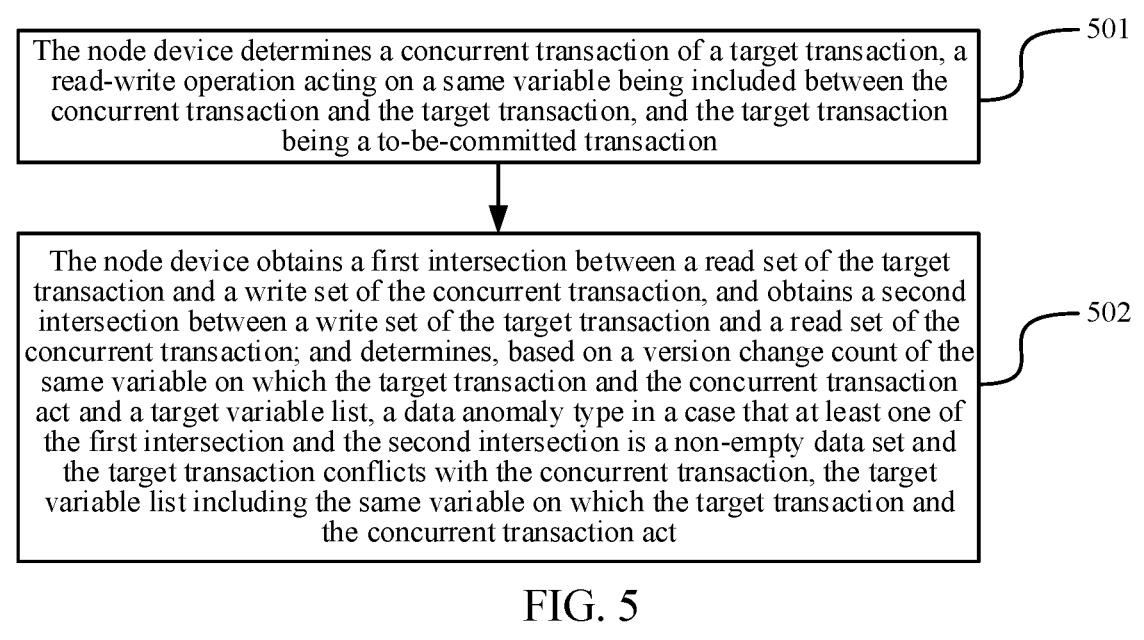

Based on the foregoing basic concepts and the symbols and corresponding meanings shown in Table 1, a transaction processing method provided in an embodiment of this application is described below with reference to FIG. 5. FIG. 5 is a flowchart of a transaction processing method according to an embodiment of this application. As shown in FIG. 5, the transaction processing method provided in this embodiment of this application is applied to any node device in a database system. When the database system is a stand-alone database system, the node device may be a stand-alone device. When the database system is a distributed database system, the node device may be a coordination node device or data node device. This embodiment of this application includes step 501 and step 502, and the steps are respectively described below.

Step 501. The node device determines a concurrent transaction of a target transaction, a read-write operation acting on a same variable being included between the concurrent transaction and the target transaction, and the target transaction is a transaction to be committed.

In this embodiment of this application, the target transaction is a global transaction or local transaction, where the global transaction refers to a transaction involving a cross-node operation. In some embodiments, the global transaction is also referred to as a distributed transaction. The local transaction refers to a transaction involving only a single node operation. The local transaction is also referred to as a regional transaction. A type of the target transaction is not limited in this embodiment of this application. The read-write operation refers to at least one of a read operation and a write operation.

The node device executes the target transaction through a read set and a write set of the transaction. The node device screens at least one candidate concurrent transaction, so as to determine a concurrent transaction of the target transaction from the screened-out at least one candidate concurrent transaction (a specific implementation of determining the concurrent transaction is subsequently described). The target transaction may be initiated by a terminal. In this case, the terminal establishes a session used for processing the target transaction with the node device, the terminal transmits an execution request for the target transaction to the node device, and the node device begins to execute the target transaction in response to the execution request for the target transaction. In some embodiments, if the terminal has established a session with the node device, then no new session needs to be established between them, and it is only necessary to reuse the currently established session.

Step 502. The node device obtains a first intersection between a read set of the target transaction and a write set of the concurrent transaction, and obtains a second intersection between a write set of the target transaction and a read set of the concurrent transaction; and determines, based on a version change count of the same variable on which the target transaction and the concurrent transaction act and a target variable list, a data anomaly type when at least one of the first intersection and the second intersection is a non-empty data set and the target transaction conflicts with the concurrent transaction, the target variable list including the same variable on which the target transaction and the concurrent transaction act.

In this embodiment of this application, that the target transaction conflicts with the concurrent transaction means that at least two operations existing in the target transaction and the concurrent transaction are conflict operations. In this case, if the target transaction is committed, a data anomaly occurs in the database system. When determining that at least one of the first intersection and the second intersection is a non-empty data set and the target transaction conflicts with the concurrent transaction, the node device determines a data anomaly type based on the version change count and the target variable list and reports the data anomaly type. The non-empty data set refers to a data set that is not an empty set, that is, a data set including a set element.

In the transaction processing method provided in this embodiment of this application, after determining a concurrent transaction of a target transaction, when at least one of a first intersection between a read set of the target transaction and a write set of the concurrent transaction and a second intersection between a write set of the target transaction and a read set of the concurrent transaction is not empty, the node device determines whether the target transaction conflicts with the concurrent transaction, and determines, if the target transaction conflicts with the concurrent transaction, a data anomaly type according to the same variable on which the two transactions act and a version change count of the same variable. This manner can confirm whether the target transaction actually conflicts with the concurrent transaction in a process of executing the target transaction; and can recognize, by determining the data anomaly type through the same variable on which the two transactions act, various data anomalies in a database system based on the serializability theory, to ensure data state consistency and improve transaction processing efficiency of the database system.

Figure 6:
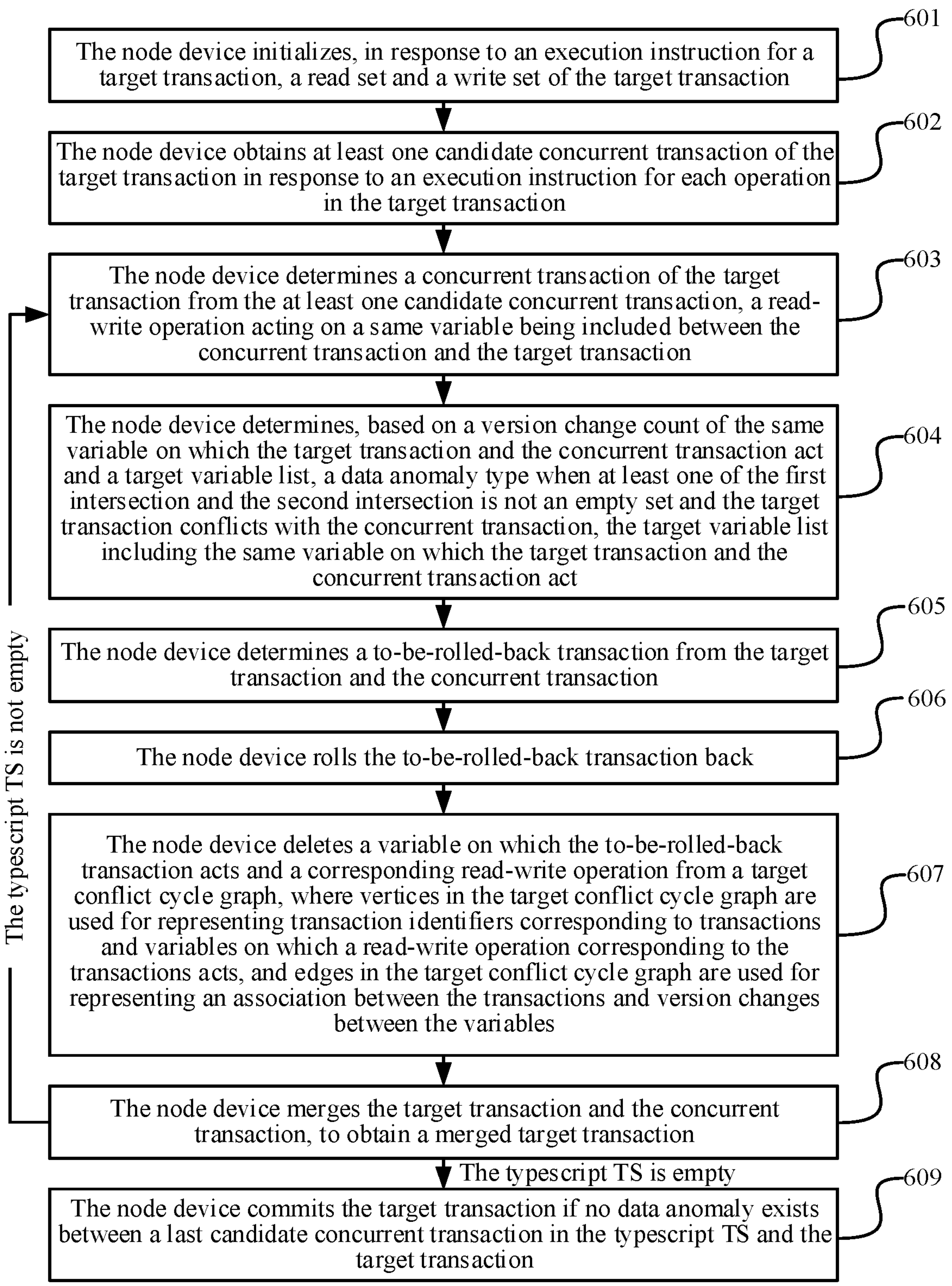
FIG. 6 is a flowchart of another transaction processing method according to an embodiment of this application.

FIG. 5 is a brief description of the transaction processing method provided in this application. The transaction processing method provided in the embodiments of this application is described below in detail with reference to FIG. 6. FIG. 6 is a flowchart of another transaction processing method according to an embodiment of this application. As shown in FIG. 6, the transaction processing method provided in this embodiment of this application is applied to any node device in a database system. When the database system is a stand-alone database system, the node device may be a stand-alone device. When the database system is a distributed database system, the node device may be a coordination node device or data node device. This embodiment of this application includes the following step 601 to step 609, and the steps are respectively described below.

Step 601. The node device initializes, in response to an execution instruction for a target transaction, a read set and a write set of the target transaction.

In this embodiment of this application, the node device initializes, in response to the execution instruction for the target transaction, the read set and the write set of the target transaction to empty sets, and allocates a global unique transaction ID to the target transaction, that is, a transaction identifier. Transaction IDs of different transactions integrally increase according to a time order in which the node device receives corresponding execution instructions. For example, the node device receives an execution instruction for a target transaction at a t1 moment and names a transaction ID of the target transaction as 1000, and if the node device receives an execution instruction for another transaction at a t2 moment, the node device names a transaction ID of the another transaction as 1001. This is not limited in this embodiment of this application.

In this embodiment of this application, in the initialization process, when the database system starts, the node device allocates an internal memory space to an operating system of the node device, and the internal memory space is used for maintaining a read set and a write set of at least one transaction; and when the target transaction begins to be executed, the node device applies for an internal memory from the internal memory space, the internal memory being used for managing a read set and a write set of the target transaction, thereby creating the read set and the write set of the target transaction on the node device, and initializes both of the created read set and write set to empty sets.

An update policy of a read set and a write set of the target transaction is described below.

After the read set and the write set are initialized, the node device determines, according to an execution statement the target transaction, whether the target transaction involves a variable update operation. When determining that the target transaction involves the variable update operation, the node device updates any variable in response to the target transaction, adds the variable to the write set of the target transaction, and allocates a version number to the variable. For example, when a transaction T updates a variable x, the variable x is added to the write set of the transaction T, and a version number is allocated to the variable x. Version numbers of write operations by different transactions on a same variable integrally increase. In this case, after performing a read operation, the node device may obtain a version number of the variable. That is, the database system maintains a progressively increasing version number for each variable. Additionally, when the node device reads any variable according to the execution statement of the target transaction, the read variable is a variable that is latest and meets the read committed rule.

The foregoing update policy may alternatively be understood as maintaining a read set and a write set of the target transaction in real time as operations of the transaction are performed. If a read operation occurs, the read variable enters the read set; and if a write operation occurs, the read variable enters the write set. If a same transaction writes a same variable a plurality of times, there are a plurality of different new versions, an old variable version is replaced with the latest variable version in the write set.

Step 601 is a process of forming a read set and a write set of a transaction involved in the foregoing step 501, and is a step of forming a read-write set of a transaction in a read-write phase.

Step 602. The node device obtains at least one candidate concurrent transaction of the target transaction in response to an execution instruction for each operation in the target transaction.

In this embodiment of this application, for each operation of the target transaction (the operation may be a read operation or may be a write operation), when the operation occurs, the node device enters a preparation phase, and the node device enters a critical region, traverses a read set and a write set of the target transaction, obtains a transaction ID of at least one candidate concurrent transaction of the target transaction (for example, all concurrent transactions), and stores the transaction ID of the at least one candidate concurrent transaction in a typescript (TS).

In this embodiment of this application, in the process of obtaining at least one candidate concurrent transaction by the node device, on each variable in an internal memory, a transaction ID of a transaction that has ever read or written the variable but has not been committed (briefly referred to as an active transaction ID) is recorded, and there may be one or more or zero active transaction IDs recorded on each variable. By obtaining each active transaction ID recorded on each variable in a read set and a write set, the node device may obtain the transaction ID of the at least one candidate concurrent transaction.

Step 602 may alternatively be understood as that when each operation of the target transaction occurs, the node device begins to make preparation, to enter the preparation phase of the target transaction, where the preparation phase is making preparation for whether the transaction T may be committed before verifying a concurrent access control anomaly of the transaction, and after finding the transaction ID of the at least one candidate concurrent transaction from the critical region, the node device exits the critical region.

Step 602 is the preparation phase in the foregoing step 501, which is used for screening out at least one candidate concurrent transaction.

Step 603. The node device determines a concurrent transaction of the target transaction from the at least one candidate concurrent transaction, a read-write operation acting on a same variable being included between the concurrent transaction and the target transaction.

In this embodiment of this application, when each operation of the target transaction occurs, the node device obtains at least one candidate concurrent transaction of the target transaction; and for any candidate concurrent transaction of the at least one candidate concurrent transaction, the node device determines, according to the candidate concurrent transaction and the read set and the write set of the target transaction, whether the candidate concurrent transaction is a concurrent transaction of the target transaction; and determines, if a read-write operation acting on a same variable is included between the candidate concurrent transaction and the target transaction, the candidate concurrent transaction as the concurrent transaction of the target transaction, and performs step 604 to step 607; otherwise, adds the candidate concurrent transaction again to a tail portion of the typescript TS.

The node device performs consistency check based on the serializability theory and whether a conflict cycle graph is formed between the at least one candidate concurrent transaction and the target transaction. Using any candidate concurrent transaction in the typescript TS as an example, the implementation process of step 603 is described in detail below. The implementation process of step 603 includes step 6031 to step 6035, and the steps are respectively described below.

Step 6031. The node device obtains a first candidate intersection between a read set of the target transaction and a write set of the candidate concurrent transaction, a second candidate intersection between a write set of the target transaction and a read set of the candidate concurrent transaction, and a third candidate intersection between the write set of the target transaction and the write set of the candidate concurrent transaction.

When the target transaction is T and the candidate concurrent transaction is TL, the node device sets the quantity of directed edges between the target transaction T and the candidate concurrent transaction TL to 0, sets a version change count of a same variable on which the target transaction and the candidate concurrent transaction act to 0, and sets a target variable list to an empty set. The quantity of the directed edges is used for representing whether there is a conflict between the target transaction and the candidate concurrent transaction; the version change count is used for representing a data state of the same variable on which the target transaction and the candidate concurrent transaction act; and the target variable list is used for storing the same variable on which the target transaction and the candidate concurrent transaction act.

In this embodiment of this application, the node device uses a dynamic line intersection (DLI) to represent the quantity of directed edges, uses a variable state (VS) to represent the version change count, and uses a variable list (VL) to represent the target variable list, that is, DLI=0; VS=0; and VL=empty set.

In this embodiment of this application, the first candidate intersection is represented as "$S1=DSR(T)\cap DSW(TL)$"; the second candidate intersection is represented as "$S2=DSR(TL)\cap DSW(T)$"; and the third candidate intersection is represented as "$S3=DSW(T)\cap DSW(TL)$".

In this embodiment of this application, when obtaining the first candidate intersection, the second candidate intersection and the third candidate intersection, the node device may use a hash table to store respective read-write sets of the target transaction and the candidate concurrent transaction, thereby obtaining corresponding intersections within linear time complexity.

Step 6032. If a union set between the first candidate intersection, the second candidate intersection and the third candidate intersection is an empty set, the node device adds the candidate concurrent transaction again to a tail portion of the typescript TS. If at least one of the first candidate intersection, the second candidate intersection and the third candidate intersection is not an empty set, the node device performs the following step 6033 to step 6035.

If a union set between the first candidate intersection, the second candidate intersection and the third candidate intersection is an empty set (that is, each of the first intersection, the second intersection and the third intersection is an empty set), it indicates that the candidate concurrent transaction is not a concurrent transaction of the target transaction. If at least one of the first candidate intersection, the second candidate intersection and the third candidate intersection is not an empty set, it indicates that the candidate concurrent transaction is a concurrent transaction of the target transaction, and then the node device determines the candidate concurrent transaction as the concurrent transaction of the target transaction, that is, the concurrent transaction involved in step 603, and performs the following step 6033 to step 6035. Additionally, when the node device determines the candidate concurrent transaction as the concurrent transaction of the target transaction, the first candidate intersection is the first intersection, the second candidate intersection is the second intersection, and the third candidate intersection is the third intersection.

Using the candidate concurrent transaction as the determined concurrent transaction as an example, step 6033 to step 6035 are described below.

Step 6033. When the first intersection is not an empty set, the node device performs incremental processing on the quantity of the directed edges and adds variables in the first intersection to the target variable list, and when the first intersection includes variables in different versions, the node device performs incremental processing on the version change count.

The incremental processing means that a corresponding value is automatically increased by one. Schematically, using an example in which the quantity of directed edges is DLI and the version change count is VS, the foregoing two types of incremental processing are respectively represented as DLI=DLI++ and VS=VS++. Additionally, that the node device adds variables in the first intersection to the target variable list means that the node device adds the variables to the target variable list in order according to a preset order.

Step 6034. When the second intersection is not empty, the node device performs incremental processing on the quantity of the directed edges and adds variables in the second intersection to the target variable list, and when the second intersection includes variables in different versions, the node device performs incremental processing on the version change count.

Step 6034 is similar to the foregoing step 6033 in the implementation process, and therefore is not repeatedly described again herein.

Step 6035. When a third intersection is not an empty set, the node device determines the data anomaly type based on a commit state of the concurrent transaction; and if the third intersection is an empty set, the node device performs subsequent step 604.

If the third intersection is not an empty set, it indicates that a write-write conflict occurs between the target transaction and the concurrent transaction, and the write-write conflict is one of reasons causing a data error in the data consistency state model, that is, the dirty write data anomaly is prohibited. Therefore, in this case, the node device determines a data anomaly type based on a commit state of the concurrent transaction, reports occurrence of a write-write anomaly, ends the current process, and rolls the target transaction back. When the third intersection is an empty set, it indicates that no write-write conflict occurs, and then the node device performs subsequent step 604.

In some embodiments, if the concurrent transaction is not committed and a target parameter T.no_committed of the target transaction is one, the node device determines the data anomaly type as a dirty write anomaly, where the target parameter T.no_committed is used for representing the quantity of committed transactions corresponding to the read-write set of the target transaction. During cycling, if no data anomaly exists between a previous concurrent transaction and the target transaction, before the current cycling is performed, the previous concurrent transaction and the target transaction need to be merged, and a new transaction obtained after the merging is determined as a target transaction of the current cycling, where the merging may be implemented by merging read-write sets of the two transactions. Therefore, during any time of cycling, the read-write set of the target transaction may be a merged read-write set, and when the read-write set of the target transaction includes a component of the read-write set of the committed transaction, the target parameter T.no_committed is used for describing the quantity of corresponding committed transactions in the read-write set.

In some embodiments, if the concurrent transaction is committed and an intersection between the first intersection and the third intersection is not an empty set, the data anomaly type is determined as the lost update anomaly.

Schematically, using an example in which the first intersection, the second intersection and the third intersection are respectively represented as S1, S2 and S3, if S3!=Ø, when any one of the following conditions is met, the node device determines a data anomaly type, and reports occurrence of the write-write anomaly, and the cycling is terminated, where to-be-met conditions include: 1) The concurrent transaction has not been committed completely and the target parameter T.no_committed of the target transaction is equal to 1. In this case, a write-write conflict is formed, and the data anomaly type is the dirty write anomaly. 2) The concurrent transaction is committed, and S1∩S3 is not an empty set. In this case, the data anomaly type is the lost update anomaly.

The node device may synchronously perform the foregoing step 6031 to step 6035, or may perform the foregoing step 6031 to step 6035 according to any order. This is not limited in this embodiment of this application.

Through the foregoing step 603, the node device determines a concurrent transaction of the target transaction from at least one candidate concurrent transaction, and if the third intersection between the target transaction and the concurrent transaction is an empty set, the node device performs the following step 604.

Step 604. The node device determines, based on a version change count of the same variable on which the target transaction and the concurrent transaction act and a target variable list, a data anomaly type when at least one of the first intersection and the second intersection is not an empty set and the target transaction conflicts with the concurrent transaction, the target variable list including the same variable on which the target transaction and the concurrent transaction act.

That at least one of the first intersection and the second intersection is not an empty set includes the following three cases: 1) the first intersection is not an empty set, and the second intersection is an empty set; 2) the first intersection is an empty set, and the second intersection is not an empty set; 3) the first intersection is not an empty set, and the second intersection is not an empty set. If the first intersection and the second intersection meet any one of the foregoing three cases, and the target transaction conflicts with the concurrent transaction, the node device determines a data anomaly type based on the version change count and the target variable list. The node device determines, based on the quantity of directed edges between the target transaction and the concurrent transaction, whether the target transaction conflicts with the concurrent transaction, that is, determines, if the quantity of directed edges between the target transaction and the concurrent transaction is greater than or equal to two, that the target transaction conflicts with the concurrent transaction.

The process of determining a data anomaly type in step 604 is described below. First, through the following four points, affiliation types, sub-types, and isolation levels of the data anomaly type involved in this embodiment of this application are respectively described.

First point: affiliation types of the data anomaly type.

In this embodiment of this application, affiliation types of the data anomaly type include a write anomaly type (WAT), a read anomaly type (RAT) and an intersect anomaly type (TAT).

If a schedule includes at least two (referred to as a first designated quantity) write operations acting on a same variable in different versions (meaning that a write anomaly condition is met), the affiliation type of the data anomaly type is the write anomaly type. If a schedule does not include at least two write operations acting on a same variable in different versions (meaning that a write anomaly condition is not met), and the schedule includes a read operation and a write operation acting on a same variable in a same version (meaning that a read anomaly condition is met), the affiliation type of the data anomaly type is the read anomaly type. If a schedule does not include at least two write operations acting on a same variable in different versions (meaning that a write anomaly condition is not met), the schedule does not include a read operation and a write operation acting on a same variable in a same version (meaning that a read anomaly condition is not met), and the schedule includes a read operation and a write operation acting on a same variable in different versions (meaning that an intersect anomaly condition is met), the affiliation type of the data anomaly type is the intersect anomaly type.

With reference to the symbols and the corresponding meanings shown in the foregoing Table 1, when $\exists T_i, T_j \epsilon TS(s)$ and $i \neq j$ in a CCG graph corresponding to a schedule s, the affiliation type of the data anomaly type may be represented as the following three forms, which are respectively described below.

1. Write anomaly type.

If $\exists \langle T_i, T_j \rangle \epsilon E = W_i[x_m]W_j[x_{m+1}]$, a data anomaly exists in the schedule s, and the affiliation type of the data anomaly type is the write anomaly type.

2. Read anomaly type.

If $\forall \langle T_i, T_j \rangle \epsilon E \neq W_i[x_m]W_j[x_{m+1}]$ and $\exists \langle T_i, T_j \rangle \epsilon E \neq W_i[x_m]R_j[x_m]$, a data anomaly exists in the schedule s, and the affiliation type of the data anomaly type is the read anomaly type.

3. Intersect anomaly type.

If $\forall \langle T_i, T_j \rangle \epsilon E \neq W_i[x_m]W_j[x_{m+1}]$, $\forall \langle T_i, T_j \rangle \epsilon E \neq W_i[x_m]R_j[x_m]$, and $\forall \langle T_i, T_j \rangle \epsilon E = R_i[x_m]W_j[x_{m+1}]$, a data anomaly exists in the schedule s, and the affiliation type of the data anomaly type is the intersect anomaly type.

Second point: sub-types of the data anomaly type.

In this embodiment of this application, the first point describes dividing the data anomaly type into such three types as the write anomaly type, the read anomaly type and the intersect anomaly type according to differences between conflicts. To improve fineness of data anomaly recognition, types of data anomalies continue to be divided, to obtain sub-types.

If a data anomaly occurs on a same variable, a sub-type of the data anomaly type in the affiliation types is a single-meta data anomaly (SDA). If a data anomaly occurs on two (referred to as a third designated quantity) variables, a sub-type of the data anomaly type in the affiliation types is a double-meta data anomaly (DDA). If a data anomaly does not belong to the foregoing two sub-types, the sub-type of the data anomaly type in the affiliation types is a multi-meta data anomaly (MDA).

Schematically, assuming the quantity of variables in a data anomaly (DA, briefly written as da) is represented as NV, the quantity of transactions is represented as NT, and a combination of NV and NT is referred to as a feature of the data anomaly and recorded as Cda=(NV, NT), the sub-types of the foregoing data anomaly type are represented as the following three cases, which are respectively described below.

1. Single-meta data anomaly.

If Cda=(1, 2), a data anomaly occurs on two transactions and one variable, and then a sub-type of the data anomaly type in the affiliation types is a single-meta data anomaly.

2. Double-meta data anomaly.

If Cda=(2, 2), a data anomaly occurs on two transactions and two variables, and then a sub-type of the data anomaly type in the affiliation types is a double-meta data anomaly.

3. Multi-meta data anomaly.

If Cda≠(1, 2) and Cda≠(2, 2), a sub-type of the data anomaly type in the affiliation types is a multi-meta data anomaly.

Third point: sub-classification of the data anomaly type.

Figure 7:
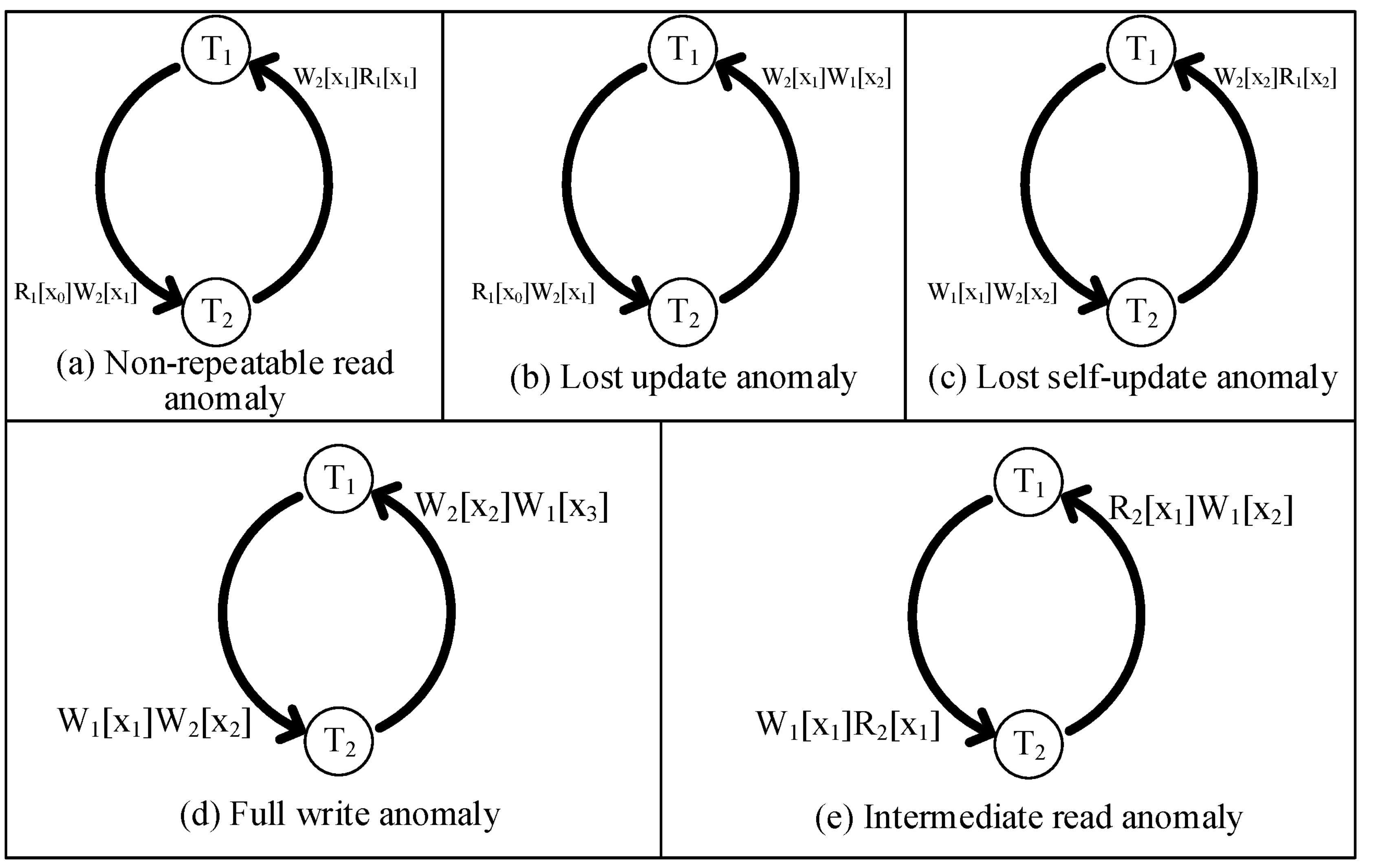
FIG. 7 is a schematic diagram of a single-meta data anomaly CCG graph according to an embodiment of this application.
Figure 8:
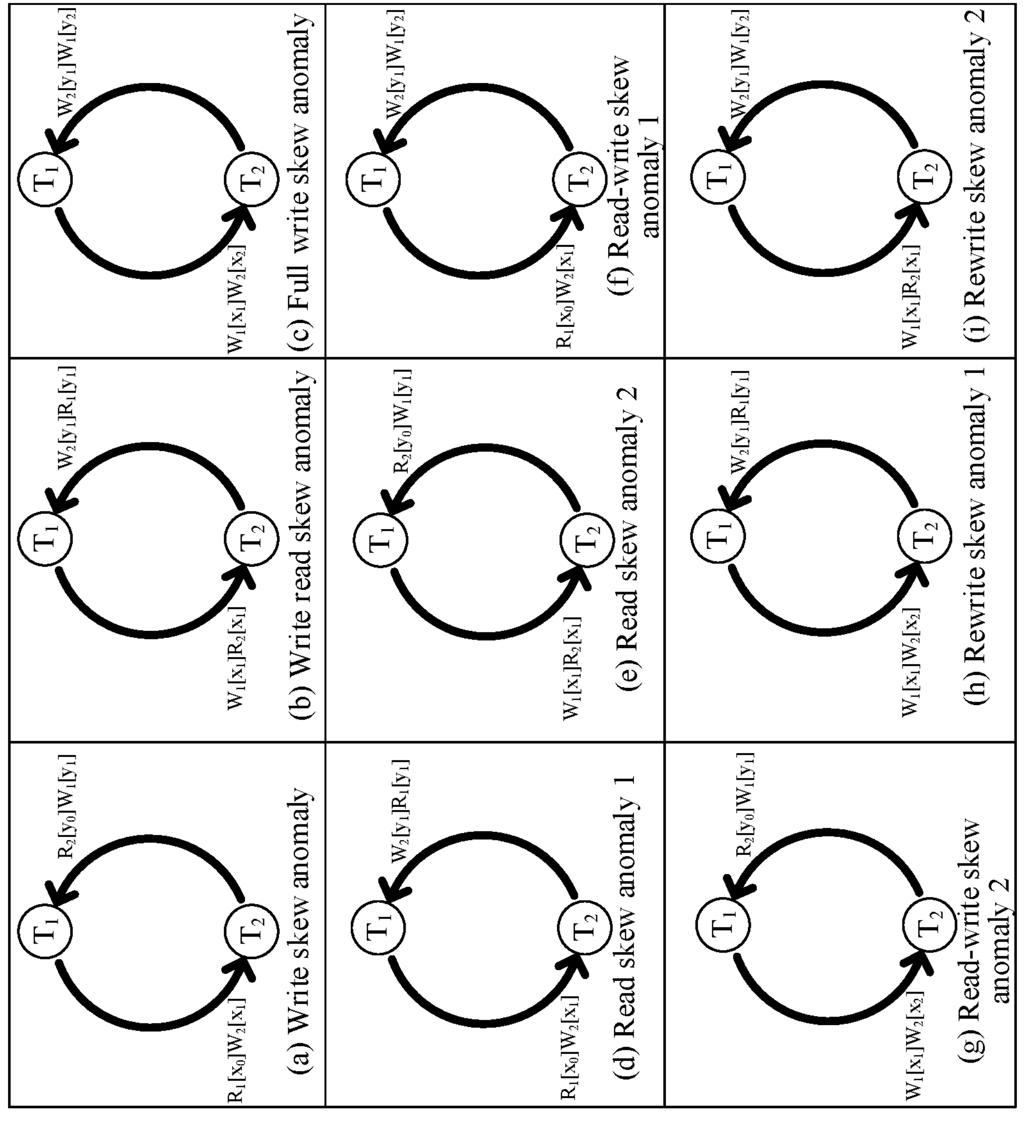
FIG. 8 is a schematic diagram of a double-meta data anomaly CCG graph according to an embodiment of this application.
Figure 9:
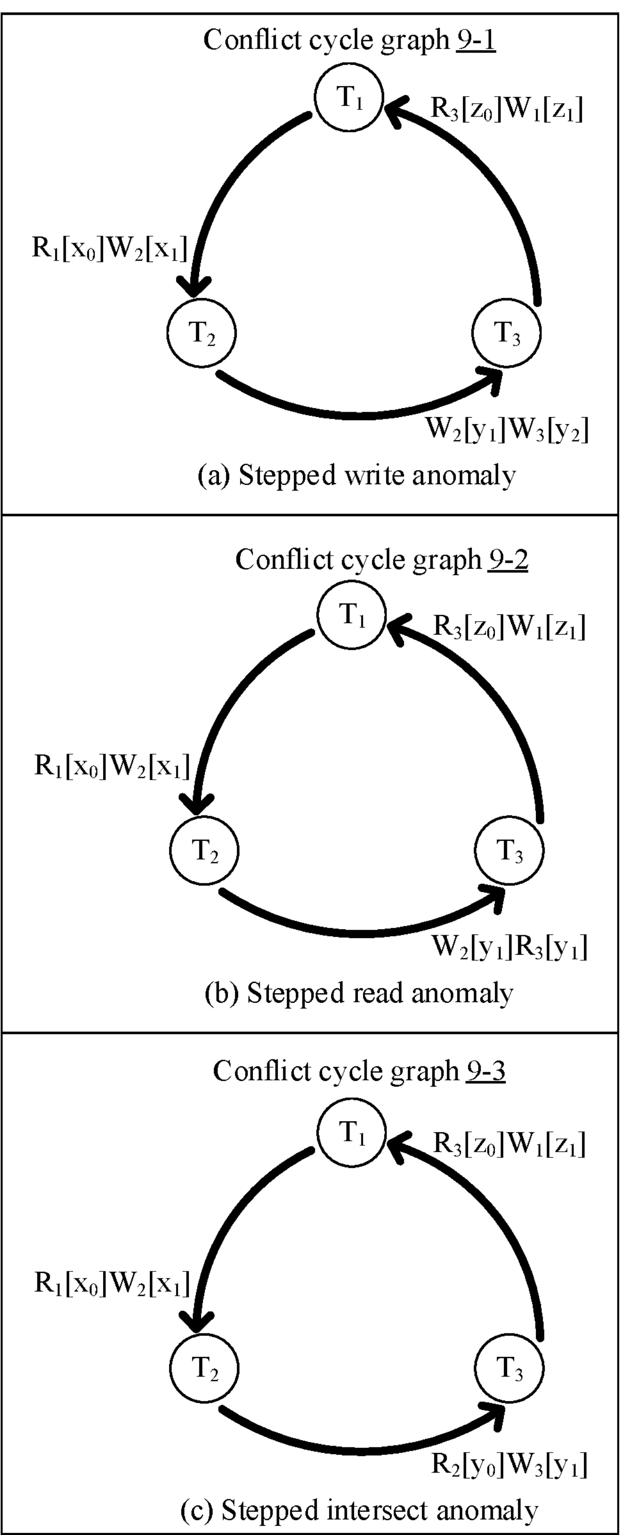
FIG. 9 is a schematic diagram of a multi-meta data anomaly CCG graph according to an embodiment of this application.

In this embodiment of this application, according to classification shown in the first point (affiliation types of the data anomaly type) and the second point (sub-types of the data anomaly type), an affiliation type, a name, a corresponding formalized representation, a corresponding CCG graph and a corresponding sub-type of each sub-classified data anomaly are provided. Specifically, as shown in Table 2 and FIG. 7 to FIG. 9, FIG. 7 is a schematic diagram of a single-meta data anomaly CCG graph according to an embodiment of this application. FIG. 8 is a schematic diagram of a double-meta data anomaly CCG graph according to an embodiment of this application. FIG. 9 is a schematic diagram of a multi-meta data anomaly CCG graph according to an embodiment of this application.

TABLE 2

| Affiliation type | Data anomaly name | Formalized representation | CCG | Sub-type |
|---|---|---|---|---|
| WAT | Lost update anomaly | $R_i[x_m] \ldots W_j[x_{m+1}] \ldots W_i[x_{m+2}]$ | (b) in FIG. 7 | SDA |
| | Lost self-update anomaly | $W_i[x_m] \ldots W_j[x_{m+1}] \ldots R_i[x_{m+1}]$ | (c) in FIG. 7 | SDA |
| | Full write anomaly | $W_i[x_m] \ldots W_j[x_{m+1}] \ldots W_i[x_{m+2}]$ | (d) in FIG. 7 | SDA |
| | Read-write skew anomaly 1 | $R_i[x_m] \ldots W_j[x_{m+1}] \ldots W_j[y_n] \ldots W_i\ [y_{n+1}]$ | (f) in FIG. 8 | DDA |
| | Read-write skew anomaly 2 | $W_i[x_m] \ldots W_j[x_{m+1}] \ldots R_j[y_n] \ldots W_i\ [y_{n+1}]$ | (g) in FIG. 8 | DDA |
| | Rewrite skew anomaly 1 | $W_i[x_m] \ldots W_j\ [x_{m+1}] \ldots W_j[y_n] \ldots R_i[y_n]$ | (h) in FIG. 8 | DDA |
| | Rewrite skew anomaly 2 | $W_i[x_m] \ldots R_j[x_m] \ldots W_j[y_n] \ldots W_i\ [y_{n+1}]$ | (i) in FIG. 8 | DDA |
| | Full write skew anomaly | $W_i[x_m] \ldots W_j[x_{m+1}] \ldots W_j[y_n] \ldots W_i\ [y_{n+1}]$ | (c) in FIG. 8 | DDA |
| | Stepped write anomaly | $\ldots W_i[x_m] \ldots W_j[x_{m+1}] \ldots$ | (a) in FIG. 9 | MDA |
| RAT | Non-repeatable read anomaly | $R_i[x_m] \ldots W_j[x_{m+1}] \ldots R_i[x_{m+1}]$ | (a) in FIG. 7 | SDA |
| | Intermediate read anomaly | $W_i[x_m] \ldots R_j[x_m] \ldots W_i[x_{m+1}]$ | (e) in FIG. 7 | SDA |
| | Read skew anomaly 1 | $R_i[x_m] \ldots W_j[x_{m+1}] \ldots W_j[y_n] \ldots R_i\ [y_n]$ | (d) in FIG. 8 | DDA |
| | Read skew anomaly 2 | $W_i[x_m] \ldots R_j[x_m] \ldots R_j[y_n] \ldots W_i\ [y_{n+1}]$ | (e) in FIG. 8 | DDA |
| | Write read skew anomaly | $W_i[x_m] \ldots R_j[x_m] \ldots W_j[y_n] \ldots W_i\ [y_n]$ | (b) in FIG. 8 | DDA |
| | Stepped read anomaly | $\ldots W_i[x_m] \ldots R_j[x_m] \ldots$ and excludes $\ldots W_{ii}[x_m] \ldots W_{jj}[x_{m+1}] \ldots$ | (b) in FIG. 9 | MDA |
| IAT | Write skew anomaly | $R_i[x_m] \ldots W_j[x_{m+1}] \ldots R_j[y_n] \ldots W_i\ [y_{n+1}]$ | (a) in FIG. 8 | DDA |
| | Stepped intersect anomaly | $\ldots R_i[x_m] \ldots W_j[x_{m+1}] \ldots$ and excludes $\ldots W_{ii}[x_m] \ldots W_{jj}[x_m] \ldots$ and $\ldots W_{iii}[x_m] \ldots W_{jjj}[x_{m+1}] \ldots$ | (c) in FIG. 9 | MDA |

For related descriptions of schematic diagrams of CCG graphs shown in FIG. 7 to FIG. 9, reference is made to described paragraphs corresponding to FIG. 2 to FIG. 4, which are not repeatedly described again in the embodiments of this application.

Compared with the single-meta data anomaly and the double-meta data anomaly, a probability of occurrence of the multi-meta data anomaly is relatively small. A schedule expression corresponding to the multi-meta data anomaly CCG graph shown in FIG. 9 is schematically described below.

As shown in a graph (a) in FIG. 9, there is a stepped write anomaly in a conflict cycle graph 9-1, a schedule expression of the stepped write anomaly is $s=R_1[x_0]\ W_2[x_1]\ W_2[y_1]\ W_3[y_2]\ R_3[z_0]\ W_1[z_1]$, and the schedule includes a WW conflict.

As shown in a graph (b) in FIG. 9, there is a stepped read anomaly in a conflict cycle graph 9-2, a schedule expression of the stepped read anomaly is $s=R_1[x_0]\ W_2[x_1]\ W_2[y_1]\ R_3[y_1]\ R_3[z_0]\ W_1[z_1]$, and the schedule includes a WR conflict, but does not include a WW conflict.

As shown in a graph (c) in FIG. 9, there is a stepped intersect anomaly in a conflict cycle graph 9-3, a schedule expression of the stepped intersect anomaly is $s=R_1[x_0]\ W_2[x_1]\ R_2[y_0]\ W_3[y_1]\ R_3[z_0]\ W_1[z_1]$, and the schedule includes a RW conflict, but includes neither a WW conflict nor a WR conflict.

Fourth point: isolation levels of the data anomaly type.

In this embodiment of this application, according to sub-classification of data anomalies shown in the foregoing third point, two isolation levels are provided, and are respectively a no read-write anomaly (NRW) and a no anomaly (NA), where the isolation levels are graded according to allowable extents to which data anomalies occur, and complexity of concurrent access control processing can be reduced through the isolation levels. NRW means that data anomalies of the WAT and RAT types are not allowed to occur, but a data anomaly of the IAT type cannot be eliminated. NA means that any data anomaly is not allowed to occur, and is equivalent to the serializability isolation level defined by the ANSI-SQL standard. Therefore, the NRW level is lower than the NA level.

Isolation levels provided in this embodiment of this application are described below with reference to Table 3.

TABLE 3

| Type | Data anomaly name | NRW | NA |
|---|---|---|---|
| WAT | Lost update anomaly | Disallowed | Disallowed |
| | Lost self-update anomaly | Disallowed | Disallowed |
| | Full write anomaly | Disallowed | Disallowed |
| | Read-write skew anomaly 1 | Disallowed | Disallowed |
| | Read-write skew anomaly 2 | Disallowed | Disallowed |
| | Rewrite skew anomaly 1 | Disallowed | Disallowed |
| | Rewrite skew anomaly 2 | Disallowed | Disallowed |
| | Full write skew anomaly | Disallowed | Disallowed |
| | Stepped write anomaly | Disallowed | Disallowed |
| RAT | Non-repeatable read anomaly | Disallowed | Disallowed |
| | Intermediate read anomaly | Disallowed | Disallowed |
| | Read skew anomaly 1 | Disallowed | Disallowed |
| | Read skew anomaly 2 | Disallowed | Disallowed |
| | Write read skew anomaly | Disallowed | Disallowed |
| | Stepped read anomaly | Disallowed | Disallowed |

TABLE 3-continued

| Type | Data anomaly name | NRW | NA |
|---|---|---|---|
| IAT | Write skew anomaly | Allowed | Disallowed |
| | Stepped intersect anomaly | Allowed | Disallowed |

The node device determines concurrent access control processing based on related information of the isolation levels described in Table 3.

In this embodiment of this application, according to the isolation levels described in Table 3, the node device can avoid occurrence of a data anomaly by setting a rule, to reach the NRW level. For example, occurrence of the WAT anomaly is avoided using a rule of prohibiting occurrence of a WW edge. In another example, occurrence of the RAT anomaly is avoided in a manner such as read committed or snapshot read. In this way, the hierarchical quantity of isolation levels can be reduced, thereby improving efficiency of concurrent access control processing. For example, the NA level can be reached by recognizing whether an anomaly occurs in two continuous RW edges using the serializable snapshot isolation (SSI) technology, and therefore efficiency of concurrent access control processing can be improved.

Through the foregoing four points, affiliation types, sub-types, and isolation levels of the data anomaly type involved in this embodiment of this application are described. The implementation process of step 604 is described in detail below based on information described in the foregoing four points, where step 604 includes step 6041 to step 6043, and the steps are respectively described below.

Step 6041. The node device determines an affiliation type based on a read-write operation in the target transaction and the concurrent transaction acting on the same variable.

The affiliation type refers to a type to which a data anomaly type is affiliated. Step 6041 includes the following three cases, and the three cases are respectively described below.

Case 1. If a first designated quantity of (such as two) write operations acting on a same variable in different versions exist in the target transaction and the concurrent transaction, the node device determines the affiliation type as the write anomaly type.

Schematically, when the target transaction is $T_i$ and the concurrent transaction is $T_j$, if $\exists<T_i,T_j>\in E=W_i[x_m]W_j[x_{m+1}]$, the node device determines the affiliation type as the write anomaly type.

Case 2. If two write operations acting on a same variable in different versions do not exist in the target transaction and the concurrent transaction, and a read operation and a write operation acting on a same variable in a same version exist in the target transaction and the concurrent transaction, the node device determines the affiliation type as the read anomaly type.

Schematically, assuming that the target transaction is $T_i$ and the concurrent transaction is $T_j$, if $\forall<T_i, T_j>\in E\neq W_i[x_m]W_j[x_{m+1}]$ and $\exists<T_i, T_j>\in E=W_i[x_m]R_j[x_m]$, the node device determines the affiliation type as the read anomaly type.

Case 3. If two write operations acting on a same variable in different versions do not exist in the target transaction and the concurrent transaction, a read operation and a write operation acting on a same variable in a same version do not exist in the target transaction and the concurrent transaction, and a read operation and a write operation acting on a same variable in different versions exist in the target transaction and the concurrent transaction, the node device determines the affiliation type as the intersect anomaly type.

Schematically, assuming that the target transaction is T, and the concurrent transaction is $T_j$, if $\forall<T_i, T_j>\in E\neq W_i[x_m]W_j[x_{m+1}]$, $\forall<T_i,T_j>\in E\neq W_i[x_m]R_j[x_m]$, and $\exists<T_i,T_j>\in E=R_i[x_m]W_j[x_{m+1}]$, the node device determines the affiliation type as the intersect anomaly type.

Step 6042. The node device determines a sub-type in the affiliation type based on the affiliation type of the data anomaly type and the target variable list.

It can be known from the foregoing step 603 that, same variables on which the target transaction and the concurrent transaction act are stored in the target variable list, that is, the node device obtains, based on the target variable list, the quantity of same variables on which the target transaction and the concurrent transaction act, thereby determining a sub-type in the affiliation type with reference to descriptions of the foregoing three sub-types.

Schematically, step 6042 includes the following three cases, and the three cases are respectively described below.

Case 1. The node device determines the sub-type in the affiliation type as a single-meta data anomaly when the quantity of variables in the target variable list is a second designated quantity (such as, two).

Case 2. The node device determines the sub-type in the affiliation type as a double-meta data anomaly when the quantity of variables in the target variable list is a third designated quantity (such as, two).

Case 3. The node device determines the sub-type in the affiliation type as a multi-meta data anomaly when the quantity of variables in the target variable list is a fourth designated quantity, where the fourth designated quantity is different from each of the second designated quantity and the third designated quantity, that is, the sub-type in the affiliation type is neither the single-meta data anomaly nor the double-meta data anomaly.

Step 6043. The node device determines the data anomaly type based on the sub-type in the affiliation type, the version change count and the read-write operation acting on the same variable in the concurrent transaction and the target transaction.

It can be known from the foregoing step 603 that, the version change count is used for representing a data state of the same variable on which the target transaction and the concurrent transaction act. Additionally, it can be further known from the foregoing Table 2 that, different data anomalies correspond to different version change counts and different read-write operations of two transactions act on a same variable. Therefore, in step 6043, the node device determines the data anomaly type based on the version change count and the read-write operation acting on the same variable in the concurrent transaction and the target transaction.

Schematically, the implementation process of step 6043 is respectively described below using eight scenarios as an example.

Scenario 1. If the affiliation type is the write anomaly type and the sub-type is the single-meta data anomaly, step 6043 includes the following three cases, and the three cases are respectively described below.

1) If the version change count is one, the node device determines the data anomaly type as the lost self-update anomaly.

2) If the version change count is two, and a fifth designated quantity of (such as three) write operations acting on a same variable exist in the target transaction and the concurrent transaction, the node device determines the data anomaly type as the full write anomaly.

3) If the version change count is two, and two write operations and a sixth designated quantity of (such as one) read operation acting on a same variable exist in the target transaction and the concurrent transaction, the node device determines the data anomaly type as the lost update anomaly.

Scenario 2. If the affiliation type of the data anomaly type is the write anomaly type and the sub-type is the double-meta data anomaly, step 6043 includes the following three cases, and the three cases are respectively described below.

1) If the version change count is one, in the target transaction and the concurrent transaction, a write operation and a read operation acting on a first variable in different versions exist (meaning that a first condition is met), and two write operations acting on a second variable in different versions exist (meaning that a second condition is met), the node device determines the data anomaly type as the read-write skew anomaly, where that the first condition is met means that the target read-write operation includes a write operation and a read operation acting on a first variable in different versions, and that the second condition is met means that the target read-write operation includes a first designated quantity of write operations acting on a second variable in different versions.

2) If the version change count is one, in the target transaction and the concurrent transaction, a write operation and a read operation acting on a first variable in a same version exist (meaning that a third condition is met), and two write operations acting on a second variable in different versions exist (meaning that a second condition is met), the node device determines the data anomaly type as the rewrite skew anomaly, where that the third condition is met means that the target read-write operation includes a write operation and a read operation acting on the first variable in a same version.

3) If the version change count is one, in the target transaction and the concurrent transaction, two write operations acting on a first variable in different versions exist (meaning that a fourth condition is met), and two write operations acting on a second variable in different versions exist (meaning that a second condition is met), the node device determines the data anomaly type as the full write skew anomaly, where that the fourth condition is met means that the target read-write operation includes the first designated quantity of write operations acting on the first variable in different versions.

Scenario 3. If the affiliation type of the data anomaly type is the read anomaly type and the sub-type is the single-meta data anomaly, step 6043 includes the following two cases, and the two cases are respectively described below.

1) If the version change count is one, and two read operations and one write operation acting on a same variable exist in the target transaction and the concurrent transaction, the node device determines the data anomaly type as the non-repeatable read anomaly.

2) If the version change count is one, and two write operations and one read operation acting on a same variable exist in the target transaction and the concurrent transaction, the node device determines the data anomaly type as the intermediate read anomaly.

Scenario 4. If the affiliation type of the data anomaly type is the read anomaly type and the sub-type is the double-meta data anomaly, step 6043 includes the following two cases, and the two cases are respectively described below.

1) If the version change count is a seventh designated quantity (such as zero), the node device determines the data anomaly type as the write read skew anomaly.

2) If the version change count is one, the node device determines the data anomaly type as the read skew anomaly.

Scenario 5. If the affiliation type of the data anomaly type is the intersect anomaly type and the sub-type is the double-meta data anomaly, step 6043 includes: If the version change count is one, the node device determines the data anomaly type as the write skew anomaly.

Scenario 6. If the affiliation type of the data anomaly type is the write anomaly type and the sub-type is the multi-meta data anomaly, step 6043 includes: The node device determines the data anomaly type as the stepped write anomaly.

Scenario 7. If the affiliation type of the data anomaly type is the read anomaly type and the sub-type is the multi-meta data anomaly, step 6043 includes: The node device determines the data anomaly type as the stepped read anomaly.

Scenario 8. If the affiliation type of the data anomaly type is the intersect anomaly type and the sub-type is the multi-meta data anomaly, step 6043 includes: The node device determines the data anomaly type as the stepped intersect anomaly.

The node device performs step 6041 to step 6043 in order, that is, the node device first determines the affiliation type of the data anomaly type, then determines the sub-type, and finally determines the sub-classified data anomaly type. In some embodiments, the foregoing step 6041 to step 6043 are replaced with the following step 1 to step 3.

Step 1. The node device determines a sub-type based on the target variable list.

Step 2. The node device determines an affiliation type based on a read-write operation in the target transaction and the concurrent transaction acting on the same variable.

Step 3. The node device determines the data anomaly type based on the sub-type in the affiliation type, the version change count and the read-write operation acting on the same variable in the concurrent transaction and the target transaction.

That is, the node device first determines the sub-type of the data anomaly type, then determines the affiliation type, and finally determines the sub-classified data anomaly type.

In some embodiments, the node device may alternatively synchronously determine an affiliation type and a sub-type of the data anomaly type. This is not limited in this embodiment of this application.

Through the foregoing step 604, after determining the data anomaly type, the node device performs the following step 605 to step 607. If at least one of the first intersection and the second intersection is not an empty set, and the target transaction does not conflict with the concurrent transaction, the node device performs the following step 608.

Step 605. The node device determines a to-be-rolled-back transaction from the target transaction and the concurrent transaction.

In this embodiment of this application, through the foregoing step 604, the node device determines that a data anomaly occurs, needs to roll the target transaction or the concurrent transaction back, and determines a to-be-rolled-back transaction from the two transactions.

Two optional implementations involved in step 605 are described below.

Implementation 1: the node device determines, based on transaction priorities, a transaction with the lowest transaction priority of the target transaction and the concurrent transaction as the to-be-rolled-back transaction.

In this embodiment of this application, the transaction priority is a preset priority, the database system allocates a transaction priority to each transaction in advance, for example, determines a transaction priority of each transaction according to at least one of a processing duration of the transaction, an operation type of the transaction and the quantity of variables on which the transaction acts, and a manner of setting a transaction priority is not limited in this embodiment of this application.

Schematically, the implementation of step 605 is described below using four manners of setting a transaction priority as an example.

First manner: if a processing duration of a current transaction in the target transaction and the concurrent transaction is less than processing durations of other transactions, the node device determines the current transaction as a transaction with the lowest transaction priority. Therefore, the to-be-rolled-back transaction is the current transaction.

A transaction priority is determined according to a processing duration of a transaction. A transaction whose processing duration is greater than a reference duration is a long transaction, a transaction whose processing duration is less than or equal to the reference duration is determined as a short transaction, and a transaction priority of the long transaction is higher than that of the short transaction. The current transaction is any one of the target transaction and the concurrent transaction, and the other transactions are transactions other than the current transaction of the target transaction and the concurrent transaction.

Schematically, for the target transaction, using the processing duration of the concurrent transaction as the reference duration, if the processing duration of the target transaction is less than that of the concurrent transaction, the node device determines the target transaction as the to-be-rolled-back transaction; otherwise, determines the concurrent transaction as the to-be-rolled-back transaction.

Second manner: if any one of the target transaction and the concurrent transaction is a read transaction, the node device determines the read transaction as a transaction with the lowest transaction priority. Therefore, the to-be-rolled-back transaction is the read transaction.

A transaction priority is determined according to an operation type of a transaction, and a transaction priority of a write transaction is higher than that of a read transaction. Operation types of transactions include a write transaction type and a read transaction type, a transaction in the write transaction type is a write transaction, and a transaction in the read transaction type is a read transaction.

Schematically, if the target transaction is a write transaction and the concurrent transaction is a read transaction, the node device determines the target transaction as the to-be-rolled-back transaction.

Third manner: if the current transaction in the target transaction and the concurrent transaction is a write transaction, and a processing duration of the write transaction is less than a reference duration, the node device determines the write transaction as a transaction with the lowest transaction priority. Therefore, the to-be-rolled-back transaction is the current transaction.

a transaction priority is determined with reference to a processing duration and an operation type of a transaction, that is, when the write transaction is a short transaction, a transaction priority thereof is lower than that of a long read transaction. Schematically, if the target transaction is a write transaction and a processing duration of the target transaction is less than a reference duration, the node device determines the target transaction as the to-be-rolled-back transaction.

In some embodiments, a manner of setting a transaction priority may alternatively be in other forms. For example, a transaction priority of a short transaction is higher than that of a long transaction. In another example, a transaction priority of a read transaction is higher than that of a write transaction. This is not limited in this embodiment of this application.

It can be understood that, through this manner of determining to-be-rolled-back transactions based on transaction priorities, the transactions can be rolled back in a targeted manner, to ensure that an important transaction is preferentially processed, thereby improving utilization of computing resources and improving efficiency of transaction processing.

Fourth manner: if the quantity of variables on which the current transaction in the target transaction and the concurrent transaction acts is greater than the quantity of variables on which other transactions act, the node device determines the current transaction as a transaction with the lowest transaction priority. Therefore, the to-be-rolled-back transaction is the current transaction.

In this embodiment of this application, the node device traverses a target conflict cycle graph of the target transaction and the concurrent transaction (the target conflict cycle graph is described in the following step 607, and is not repeatedly described again herein), and when the current transaction acts on the largest quantity of variables, the current transaction is determined as a to-be-rolled-back transaction.

Through this optional implementation, a transaction involving a relatively large quantity of variables is rolled back, which can reduce a possibility that the transaction conflicts with other transactions during subsequent transaction processing, thereby reducing a conflict rate of transaction processing and improving efficiency of transaction processing.

Implementation 2: the node device determines a transaction randomly selected from the target transaction and the concurrent transaction as a to-be-rolled-back transaction.

Step 606. The node device rolls the to-be-rolled-back transaction back.

Through the foregoing step 601 to step 606, the node device determines whether the target transaction conflicts with the concurrent transaction, and determines a to-be-rolled-back transaction only when a data anomaly exists.

It can be understood that, the node device determines a to-be-rolled-back transaction according to a specific policy instead of directly rolling the target transaction back. In this way, a false rollback rate can be effectively reduced, thereby improving utilization of computing resources and improving efficiency of transaction processing.

Step 607. The node device deletes a variable on which the to-be-rolled-back transaction acts and a corresponding read-write operation from a target conflict cycle graph, where vertices in the target conflict cycle graph are used for representing transaction identifiers corresponding to transactions and variables on which a read-write operation corresponding to the transactions acts, and edges in the target conflict cycle graph are used for representing an association between the transactions and version changes between the variables.

In this embodiment of this application, the target conflict cycle graph is a detail conflict cycle graph (DCCG), is a conflict cycle graph equivalent to the CCG graph and the CCSG graph, and is an implementation basis of the data state consistency model in this embodiment of this application. After rolling the to-be-rolled-back transaction back through the foregoing step 606, the node device deletes a variable on which the to-be-rolled-back transaction acts and a corresponding read-write operation from a target conflict cycle graph, to maintain the structure of the target conflict cycle graph.

A manner of obtaining the target conflict cycle graph is described in detail below, and includes the following step 1 to step 3, and the steps are respectively described below.

Step 1. Obtain a first conflict cycle graph between the target transaction and the concurrent transaction, where vertices in the first conflict cycle graph are used for representing transaction identifiers corresponding to transactions, and edges in the first conflict cycle graph are used for representing an association between the transactions and variables on which a read-write operation corresponding to the transactions acts.

The first conflict cycle graph is a CCG graph between the target transaction and the concurrent transaction. For meanings of vertices and edges in the first conflict cycle graph, reference is made to the foregoing descriptions about vertices and edges of the CCG graph, and the meanings are not repeatedly described again herein.

Step 2. Transform the first conflict cycle graph, to obtain a second conflict cycle graph, where vertices in the second conflict cycle graph are used for representing variables in a plurality of different versions, and edges in the second conflict cycle graph are used for representing version changes between the variables and variables on which a same transaction acts.

The second conflict cycle graph is a CCSG graph between the target transaction and the concurrent transaction. For meanings of vertices and edges in the second conflict cycle graph, reference is made to the foregoing descriptions about vertices and edges of the CCSG graph, and the meanings are not repeatedly described again herein. It can be known based on the foregoing descriptions about the CCG graph and the CCSG graph that, the CCG graph is equivalent to the CCSG graph. An implementation of step 2 is briefly described below based on an equivalent transformation rule of transforming the CCG graph to the CCSG graph, and includes the following step A and step B, and the steps are respectively described below.

Step A. Split edges of the first conflict cycle graph, to obtain the variables in the plurality of different versions.

Step B. Use the variables in the plurality of different versions as vertices, add an edge between vertices corresponding to a same variable in adjacent versions, and add an edge between vertices corresponding to variables on which a same transaction acts, to obtain the second conflict cycle graph.

Step 3. Transform the second conflict cycle graph, to obtain the target conflict cycle graph.

It can be known based on the foregoing descriptions about the CCG graph and the CCSG graph that, the CCG graph is equivalent to the CCSG graph, the CCSG graph can be equivalently transformed into the CCG graph, and the target conflict cycle graph is a new CCG graph obtained by transforming the CCSG graph. In the foregoing first conflict cycle graph, vertices in the first conflict cycle graph are used for representing transaction identifiers corresponding to transactions, and in the target conflict cycle graph (that is, new CCG graph), vertex information of the target conflict cycle graph is more refined compared with vertex information of the first conflict cycle graph, and includes both transaction identifiers corresponding to transactions and variables on which a read-write operation corresponding to transactions acts. Additionally, in variables corresponding to vertices of the target conflict cycle graph, necessary variables forming a conflict cycle are reserved, because one transaction may operate many variables, but not all variables and versions thereof are sufficient conditions forming the conflict cycle graph.

A specific implementation of step 3 is described below based on an equivalent transformation rule of transforming the CCSG graph to the CCG graph, and includes the following step C to step E, and the steps are respectively described below.

Step C. Merge vertices corresponding to the variables on which the same transaction acts in the second conflict cycle graph, and determine a transaction identifier corresponding to the same transaction as a merged vertex. That is, the node device names a merged vertex as a transaction identifier corresponding to a same transaction.

Step D. Add an edge between adjacent vertices of the merged second conflict cycle graph, to obtain a third conflict cycle graph.

Step E. When any two adjacent vertices of the third conflict cycle graph include variables in a same version, merge the any two adjacent vertices, and delete the variables in the same version corresponding to the merged vertex, to obtain the target conflict cycle graph; and when any two adjacent vertices of the third conflict cycle graph include a same variable in different versions, merge the any two adjacent vertices, to obtain the target conflict cycle graph.

The third conflict cycle graph is a CCG graph obtained by transforming a CCSG graph according to an equivalent transformation rule. In the third conflict cycle graph, if any two adjacent vertices include variables in a same version, the third conflict cycle graph is applicable to a reduction rule, so that the node device merges the two vertices, and deletes the variables in the same version; if any two adjacent vertices include a same variable in different versions, the third conflict cycle graph is applicable to a merging rule but not applicable to a reduction rule, so that the node device merges the two vertices; if any two adjacent vertices do not include a same variable, the node device directly uses the third conflict cycle graph as the target conflict cycle graph.

The foregoing reduction rule and merging rule are described below.

First: reduction rule.

For any two adjacent vertices $V_i$ and $V_{i+1}$ in a conflict cycle graph, if $V_i \cap V_{i+1}=\{x_m, y_n, \ldots\} \neq \emptyset$, that is, include variables in at least one same version, $V_i$ and $V_{i+1}$ may be merged into one vertex; in the new vertex obtained after merging, $x_m$, $y_n$ and the like may be removed, and non-intersecting parts in the two vertices are reserved, that is, $V_i \cup V_{i+1}-V_i \cap V_{i+1}$. That is, in the new vertex obtained after reduction, a difference set of such two sets as $V_i$ and $V_{i+1}$ are reserved.

Based on the foregoing description about the target conflict cycle graph and the reduction rule, the following three conclusions can be obtained, and the conclusions are respectively described below.

Conclusion 1: If in a schedules, ∃dccg∈DCCG, and an intersection of any two adjacent vertices of the dccg graph is an empty set, the dccg is referred to as a minimum DCCG graph, that is, after vertices in the dccg graph that meet the reduction rule are reduced, a most simplified DCCG graph is obtained.

Conclusion 2: A minimum DCCG graph is equivalent to a data anomaly in the foregoing Table 2.

Conclusion 3: If in a schedule s, a WR relationship exists between any two concurrent transactions, the two concurrent transactions may be applicable to the reduction rule.

Second: merging rule.

For any two adjacent vertices $V_i$ and $V_{i+1}$ in a conflict cycle graph, if $V_i \cap V_{i+1} = \emptyset$, the two vertices cannot be reduced; if $V_i \cap V_{i+1} = \{x, y, \ldots\} \neq \emptyset$, that is, include at least one same variable, and are not applicable to the reduction rule, the two adjacent vertices are applicable to the merging rule; that is to say, transactions corresponding to the two adjacent vertices are referred to as mergeable transactions, $V_i$ and $V_{i+1}$ are merged into one vertex, a read set of a transaction corresponding to the new vertex obtained after merging is a union set of read sets corresponding to $V_i$ and $V_{i+1}$ and a write set of the transaction corresponding to the new vertex obtained after merging is a union set of write sets corresponding to $V_i$ and $V_{i+1}$.

Additionally, based on the foregoing description about the target conflict cycle graph and the merging rule, the following conclusion can be obtained: A data anomaly represented by a dccg graph of a schedule s does not affect a data anomaly equivalent to the original dccg graph after mergeable transactions are merged.

Figure 10:
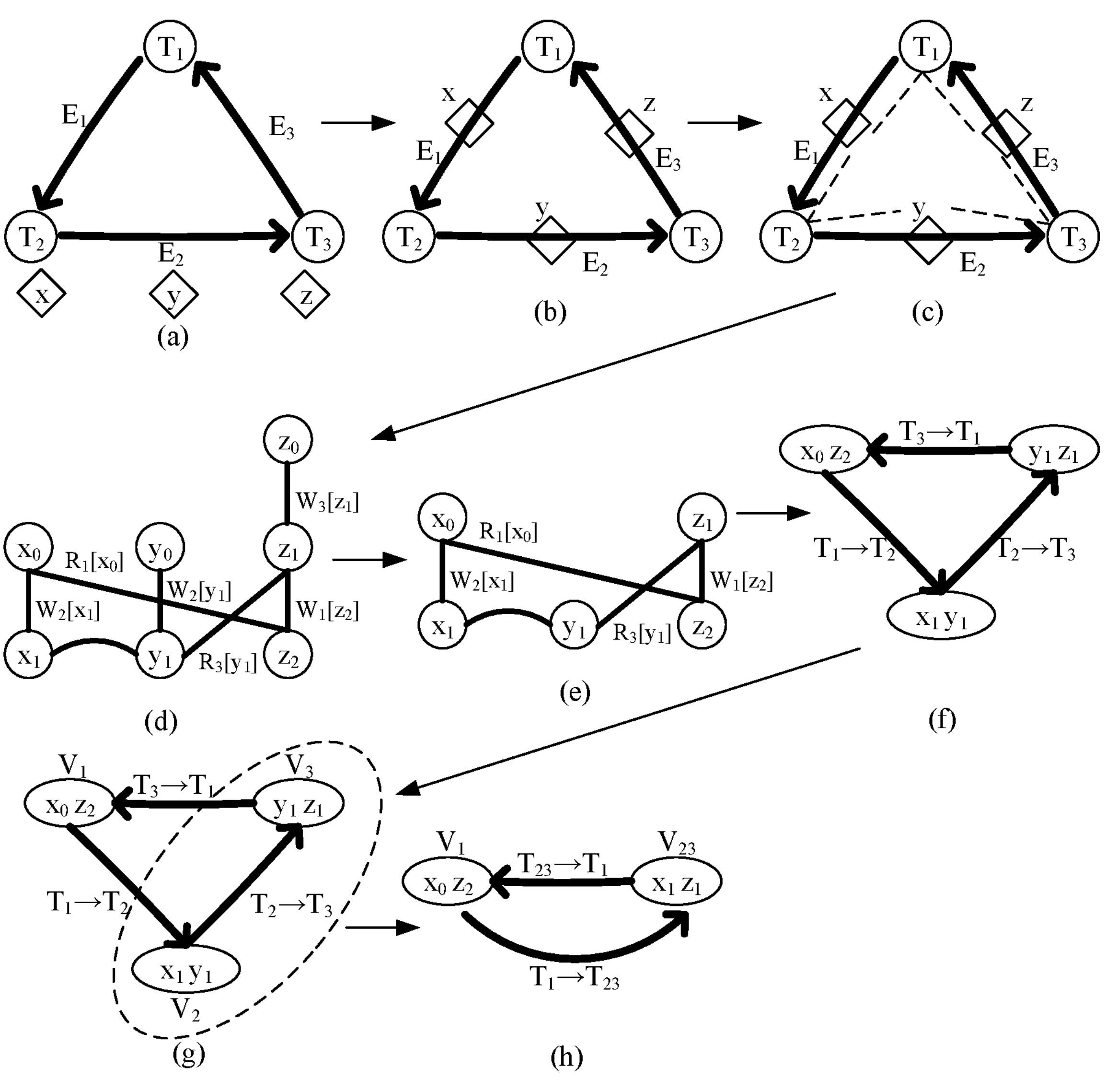
FIG. 10 is a schematic diagram of obtaining a target conflict cycle graph according to an embodiment of this application.

The manner of obtaining the target conflict cycle graph and the related rules are described above, and the manner of obtaining the target conflict cycle graph is described below with an example with reference to Table 4 and FIG. 10, where FIG. 10 is a schematic diagram of obtaining a target conflict cycle graph according to an embodiment of this application. One schedule s includes three transactions $T_1$, $T_2$ and $T_3$, whose execution sequence is shown in Table 4.

TABLE 4

| Moment | $T_1$ | $T_2$ | $T_3$ |
|---|---|---|---|
| $t_0$ | $R_1[x_0]$ | | |
| $t_1$ | | $W_2[x_1]$ | |
| $t_2$ | | $W_2[y_1]$ | |
| $t_3$ | | | $R_3[y_1]$ |
| $t_4$ | | | $W_3[z_1]$ |
| $t_5$ | $W_1[z_2]$ | | |

As shown in (a) in FIG. 10, edges in the CCG graph (that is, the first conflict cycle graph) of the schedules are used for representing an association between transactions and variables on which a read-write operation corresponding to transactions acts, and include the following three edges: $E_1=(T_1 \rightarrow T_2, R_1[x_0]\ W_2[x_1])$, $E_2=(T_2 \rightarrow T_3, W_2[y_1]\ R_3[y_1])$, and $E_3=(T_3 \rightarrow T_1, W_3[z_1]\ W_1[z_2])$; and correspond to three variables x, y and z.

As shown in (b) and (c) in FIG. 10, the CCG graph includes three variables x, y and z, respectively located at the edges $E_1$, $E_2$ and $E_3$, and the three edges are split using the variables as vertices. For example, $E_1$ is represented as $R_1[x_0]\ W_2[x_1]$, and the edge is split, to obtain $E_{11}=R_1[x_0]$ and $E_{12}=W_2[x_1]$ $E_2$ is represented as $W_2[y_1]\ R_3[y_1]$, and the edge is split, to obtain $E_{21}=W_2[y_1]$ and $E_{22}=R_3[y_1]$ $E_3$ is represented as $W_3[z_1]\ W_1[z_2]$, and the edge is split, to obtain $E_{31}=W_3[z_1]$ and $E_{32}=W_1[z_2]$. Therefore, the vertices in the CCG graph are deleted.

As shown in (d) in FIG. 10, after the foregoing edge splitting process, two versions $x_0$ and $x_1$ of the variable x, one version $y_1$ of the variable y and two versions $z_1$ and $z_2$ of the variable z are obtained. The versions of these variables are used as vertices of the CCSG graph, a plurality of versions of a same variable are arranged in a longitudinal direction, and versions of different variables on which a same transaction acts are arranged in a transverse direction (it is to be understood that, (d) in FIG. 10 further includes the initial version $z_0$ of the variable z, which can correspond to the edge $E_{31}$ only in this way). An edge is added between vertices corresponding to a same variable in adjacent versions. An edge is added between vertices corresponding to variables on which a same transaction acts. Additionally, it can be known based on the foregoing description about the CCSG graph that, the CCSG graph is a graph formed by a directed cycle, and then the edges $W_3[z_1]$ and $W_2[y_1]$ and the variable versions $z_0$ and $y_0$ play no role in forming the directed cycle, so that the two edges and the two variable versions are deleted, to obtain the CCSG graph shown in (e) in FIG. 10.

As shown in (e) in FIG. 10, vertices in the CCSG graph (that is, the second conflict cycle graph) are used for representing variables in a plurality of different versions, and edges in the second conflict cycle graph are used for representing version changes between the variables and variables on which a same transaction acts. Schematically, vertices $V=\{x_0, x_1, y_1, z_1, z_2\}$; $E=\{W_2[x_1], R_2[x_1]\ R_2[y_1], R_3[y_1]\ R_3[z_1], W_1[z_2], R_1[x_2]R_1[x_0]\}$, where $E_T=\{R_2[x_1]\ R_2[y_1], R_3[y_1]\ R_3[z_1], R_1[x_2]\ R_1[x_0]\}$; $E_s=\{W_2[x_1], W_1[z_2]\}$.

As shown in (f) in FIG. 10, (f) in FIG. 10 is a new CCG graph (that is, the third conflict cycle graph) obtained by transforming the CCSG graph shown in (e) in FIG. 10. The transformation process includes: the node device merges variable versions involved in a same transaction in the CCSG graph into a same vertex, to obtain (f) in FIG. 10. As shown in (f) in FIG. 10, for each vertex, a transaction is used as the vertex again, to show an association between transactions. In some embodiments, the graph may alternatively be an undirected cycle graph.

As shown in (g) in FIG. 10, vertices $V_2$ and $V_3$ meet the foregoing reduction rule, that is, the two vertices both include a variable yi in a same version. Therefore, the vertices $V_2$ and $V_3$ are merged, and the variable yi in the merged vertex is deleted, to obtain the DCCG graph (that is, the target conflict cycle graph) shown in (h) in FIG. 10.

The manner of obtaining the target conflict cycle graph is described above through an exemplary manner, and may be alternatively understood as a process of determining a directed cycle graph between concurrent transactions. In step 607, after determining the to-be-rolled-back transaction, the node device maintains the structure of the target conflict cycle graph, to help subsequently perform a next time of cycling, that is, perform consistency check on another candidate concurrent transaction of the at least one candidate concurrent transaction.

A case that the target transaction does not conflict with the concurrent transaction is described below through step 608.

Step 608. The node device merges the target transaction and the concurrent transaction, to obtain a merged target transaction, and performs the foregoing step 603 again until the typescript TS is empty.

In this embodiment of this application, through the foregoing step 604, if at least one of the first intersection and the second intersection is not an empty set, and the target transaction does not conflict with the concurrent transaction, which may be alternatively understood as that no target conflict cycle graph is formed between the target transaction and the concurrent transaction, no data anomaly exists in the target transaction and the concurrent transaction, and the node device merges the two transactions, to obtain a merged target transaction, and continues to select a candidate concurrent transaction from the typescript TS, until the typescript TS is empty.

The implementation of step 608 is described below using an example in which the target transaction is T and the concurrent transaction is TL.

The node device merges a read set of the concurrent transaction TL into a read set of the target transaction T, and merges a write set of the concurrent transaction TL into a write set of the target transaction T, so as to implement transaction merging, to obtain a merged new transaction T-new. Moreover, if the concurrent transaction TL has not been committed, incremental processing is performed on a target parameter (no_committed) of T-new, that is, T-new.no_committed ++ (automatically increase by 1), indicating that the new transaction obtained by merging owns a component of a read-write set of a committed transaction. Based on this, the node device determines T-new as a new target transaction T' (that is, T'=T-new), takes out a second candidate concurrent transaction from the typescript TS and determines the second candidate concurrent transaction as TL', and performs step 603 (determine whether there is a conflict between new T-new and TL').

Step 609. The node device commits the target transaction if no data anomaly exists between a last candidate concurrent transaction in the typescript TS and the target transaction.

In this embodiment of this application, if no data anomaly exists between the last candidate concurrent transaction in the typescript TS and the target transaction, it indicates that the target transaction may be committed. If an isolation level parameter=S, that is, an isolation level is a serializability level, the serializability level may be met; otherwise, the isolation level set in the foregoing Table 3 is met.

All of the above technical solutions are combined randomly to form embodiments of this application. Details are not described herein again.

Figure 11:
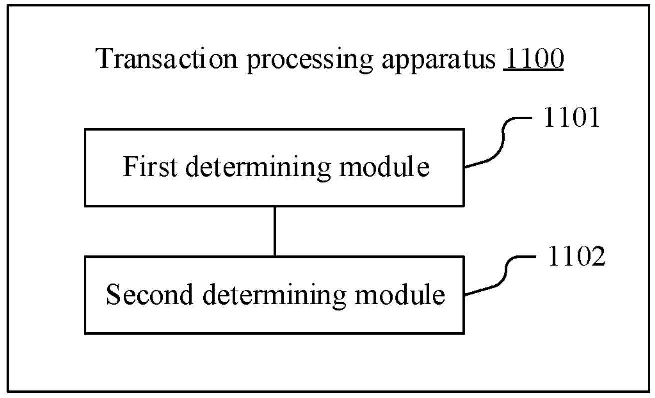
FIG. 11 is a schematic structural diagram of a transaction processing apparatus according to an embodiment of this application.

FIG. 11 is a schematic structural diagram of a transaction processing apparatus according to an embodiment of this application. The transaction processing apparatus is configured to perform steps of the foregoing transaction processing method when being performed. Referring to FIG. 11, the transaction processing apparatus 1100 includes: a first determining module 1101 and a second determining module 1102.

The first determining module 1101 is configured to determine a concurrent transaction of a target transaction, a read-write operation acting on a same variable being included between the concurrent transaction and the target transaction, and the target transaction being a to-be-committed transaction;

the second determining module 1102 is configured to obtain a first intersection between a read set of the target transaction and a write set of the concurrent transaction, and obtain a second intersection between a write set of the target transaction and a read set of the concurrent transaction; and determine, based on a version change count of the same variable on which the target transaction and the concurrent transaction act and a target variable list, a data anomaly type when at least one of the first intersection and the second intersection is a non-empty data set and the target transaction conflicts with the concurrent transaction, the target variable list including the same variable on which the target transaction and the concurrent transaction act.

In this embodiment of this application, the transaction processing apparatus 1100 further includes a third determining module and a rollback module; the third determining module is configured to determine a to-be-rolled-back transaction from the target transaction and the concurrent transaction; and the rollback module is configured to roll the to-be-rolled-back transaction back.

In this embodiment of this application, the third determining module is configured to determine, based on transaction priorities, a transaction with the lowest transaction priority of the target transaction and the concurrent transaction as the to-be-rolled-back transaction.

In this embodiment of this application, the third determining module is configured to, in the target transaction and the concurrent transaction, determine, when a processing duration of a current transaction is less than processing durations of other transactions, the current transaction as the transaction with the lowest transaction priority, where the current transaction is any one of the target transaction and the concurrent transaction, and the other transactions are transactions other than the current transaction of the target transaction and the concurrent transaction; in the target transaction and the concurrent transaction, determine, when the current transaction is a read transaction, the current transaction as the transaction with the lowest transaction priority; in the target transaction and the concurrent transaction, determine, when the current transaction is a write transaction and the processing duration of the current transaction is less than a reference duration, the current transaction as the transaction with the lowest transaction priority; and in the target transaction and the concurrent transaction, determine, when the quantity of variables on which the current transaction acts is greater than the quantity of variables on which the other transactions act, the current transaction as the transaction with the lowest transaction priority.

In this embodiment of this application, the transaction processing apparatus 1100 further includes a deleting module, configured to delete a variable on which the to-be-rolled-back transaction acts and a corresponding read-write operation from a target conflict cycle graph, where vertices in the target conflict cycle graph are used for representing transaction identifiers corresponding to transactions and variables on which a read-write operation corresponding to the transactions acts, and edges in the target conflict cycle graph are used for representing an association between the transactions and version changes between the variables.

In this embodiment of this application, the transaction processing apparatus 1100 further includes an obtaining module, configured to obtain the target conflict cycle graph between the target transaction and the concurrent transaction.

In this embodiment of this application, the obtaining module includes an obtaining sub-module, a first transformation module and a second transformation module. The obtaining sub-module is configured to obtain a first conflict cycle graph between the target transaction and the concurrent transaction, where vertices in the first conflict cycle graph are used for representing transaction identifiers corresponding to transactions, and edges in the first conflict cycle graph are used for representing an association between the transactions and variables on which a read-write operation corresponding to the transactions acts. The first transformation module is configured to transform the first conflict cycle graph, to obtain a second conflict cycle graph, where vertices in the second conflict cycle graph are used for representing variables in a plurality of different versions, and edges in the second conflict cycle graph are used for representing version changes between the variables and variables on which a same transaction acts. The second transformation module is configured to transform the second conflict cycle graph, to obtain the target conflict cycle graph.

In this embodiment of this application, the first transformation module is configured to split edges of the first conflict cycle graph, to obtain the variables in the plurality of different versions and use the variables in the plurality of different versions as vertices. The first transformation module is configured to add an edge between vertices corresponding to a same variable in adjacent versions, and add an edge between vertices corresponding to variables on which a same transaction acts, to obtain the second conflict cycle graph.

In this embodiment of this application, the second transformation module is configured to merge vertices corresponding to the variables on which the same transaction acts in the second conflict cycle graph, and determine a transaction identifier corresponding to the same transaction as a merged vertex; add an edge between adjacent vertices of the merged second conflict cycle graph, to obtain a third conflict cycle graph. The second transformation module is configured to, when two adjacent vertices of the third conflict cycle graph include variables in a same version, merge the two adjacent vertices, and deleting the variables in the same version in the merged vertex, to obtain the target conflict cycle graph; and when two adjacent vertices of the third conflict cycle graph include a same variable in different versions, merge the two adjacent vertices, to obtain the target conflict cycle graph.

In this embodiment of this application, the transaction processing apparatus 1100 further includes a first processing module, a second processing module and a third processing module. The first processing module is configured to, when the first intersection is the non-empty data set, perform incremental processing on the quantity of directed edges between the target transaction and the concurrent transaction and add variables in the first intersection to the target variable list, and when the first intersection includes variables in different versions, perform incremental processing on the version change count, the quantity of the directed edges being used for indicating whether the target transaction and the concurrent transaction conflict with each other. The second processing module is configured to, when the second intersection is the non-empty data set, perform incremental processing on the quantity of the directed edges and adding variables in the second intersection to the target variable list, and when the second intersection includes variables in different versions, perform incremental processing on the version change count. The third processing module is configured to, when a third intersection is the non-empty data set, determine the data anomaly type based on a commit state of the concurrent transaction, where the third intersection is an intersection between the write set of the target transaction and the write set of the concurrent transaction.

In this embodiment of this application, the second determining module 1102 includes a first determining sub-module, a second determining sub-module and a third determining sub-module. The first determining sub-module is configured to determine an affiliation type based on a target read-write operation in the target transaction and the concurrent transaction acting on the same variable. The second determining sub-module is configured to determine a sub-type in the affiliation type based on the affiliation type and the target variable list. The third determining sub-module is configured to determine the data anomaly type based on at least one of the sub-type in the affiliation type, the version change count, and the target read-write operation.

In this embodiment of this application, the first determining sub-module is further configured to determine the affiliation type as a write anomaly type when the target read-write operation in the target transaction and the concurrent transaction meets a write anomaly condition, where that the write anomaly condition is met means that the target read-write operation includes a first designated quantity of write operations acting on a same variable in different versions; determining the affiliation type as a read anomaly type when the target read-write operation does not meet the write anomaly condition and meets a read anomaly condition, where that the read anomaly condition is met means that the target read-write operation includes a read operation and a write operation acting on a same variable in a same version; and determining the affiliation type as an intersect anomaly type when the target read-write operation meets neither of the write anomaly condition and the read anomaly condition and meets an intersect anomaly condition, where that the intersect anomaly condition is met means that the target read-write operation includes a read operation and a write operation acting on a same variable in different versions.

In this embodiment of this application, the second determining sub-module is further configured to determine the sub-type in the affiliation type as a single-meta data anomaly when the quantity of variables in the target variable list is a second designated quantity; determining the sub-type in the affiliation type as a double-meta data anomaly when the quantity of variables in the target variable list is a third designated quantity; and determining the sub-type in the affiliation type as a multi-meta data anomaly when the quantity of variables in the target variable list is a fourth designated quantity, where the fourth designated quantity is different from each of the second designated quantity and the third designated quantity.

In this embodiment of this application, when the affiliation type is a write anomaly type and the sub-type is a single-meta data anomaly, the third determining sub-module is further configured to determine, when the version change count is a second designated quantity, the data anomaly type as a lost self-update anomaly based on the write anomaly type and the single-meta data anomaly; determining, when the version change count is a third designated quantity and the target read-write operation is a fifth designated quantity of write operations, the data anomaly type as a full write anomaly based on the write anomaly type and the single-meta data anomaly; and determining, when the version change count is the third designated quantity and the target read-write operation is a first designated quantity of write operations and a sixth designated quantity of read operations, the data anomaly type as a lost update anomaly based on the write anomaly type and the single-meta data anomaly.

In this embodiment of this application, when the affiliation type is a write anomaly type, the sub-type is a double-meta data anomaly, and the version change count is a second designated quantity, the third determining sub-module is further configured to determine, when the target read-write operation meets a first condition and a second condition, the data anomaly type as a read-write skew anomaly based on the write anomaly type, the double-meta data anomaly, and the second designated quantity, where that the first condition is met means that the target read-write operation includes a write operation and a read operation acting on a first variable in different versions, and that the second condition is met means that the target read-write operation includes a first designated quantity of write operations acting on a second variable in different versions; determining, when the target read-write operation meets a third condition and the second condition, the data anomaly type as a rewrite skew anomaly based on the write anomaly type, the double-meta data anomaly, and the second designated quantity, where that the third condition is met means that the target read-write operation includes a write operation and a read operation acting on the first variable in a same version; and determining, when the target read-write operation meets a fourth condition and the second condition, the data anomaly type as a full write skew anomaly based on the write anomaly type, the double-meta data anomaly, and the second designated quantity, where that the fourth condition is met means that the target read-write operation includes the first designated quantity of write operations acting on the first variable in different versions.

In this embodiment of this application, when the affiliation type is a read anomaly type, the sub-type is a single-meta data anomaly, and the version change count is a second designated quantity, the third determining sub-module is further configured to determine, when the target read-write operation includes a first designated quantity of read operations and a sixth designated quantity of write operations acting on a same variable, the data anomaly type as a non-repeatable read anomaly based on the read anomaly type, the single-meta data anomaly, and the second designated quantity; and determining, when the target read-write operation includes the first designated quantity of write operations and the sixth designated quantity of read operations acting on a same variable, the data anomaly type as an intermediate read anomaly based on the read anomaly type, the single-meta data anomaly, and the second designated quantity.

In this embodiment of this application, when the affiliation type is a read anomaly type and the sub-type is a double-meta data anomaly, the third determining sub-module is further configured to determine, when the version change count is a seventh designated quantity, the data anomaly type as a write read skew anomaly based on the read anomaly type and the double-meta data anomaly; and determining, when the version change count is a second designated quantity, the data anomaly type as a read skew anomaly based on the read anomaly type and the double-meta data anomaly.

In this embodiment of this application, the third determining sub-module is further configured to determine the data anomaly type as a write skew anomaly when the affiliation type is an intersect anomaly type, the sub-type is a double-meta data anomaly, and the version change count is a second designated quantity.

In this embodiment of this application, the third determining sub-module is further configured to determine the data anomaly type as a stepped write anomaly when the affiliation type is a write anomaly type and the sub-type is a multi-meta data anomaly; determining the data anomaly type as a stepped read anomaly when the affiliation type is a read anomaly type and the sub-type is the multi-meta data anomaly; and determining the data anomaly type as a stepped intersect anomaly when the affiliation type is an intersect anomaly type and the sub-type is the multi-meta data anomaly.

Division of the foregoing functional modules are described as an example when the transaction processing apparatus provided in the foregoing embodiments performs transaction processing. In an actual application, the foregoing functions may be allocated according to needs to be implemented by different functional modules, that is, the internal structure of the apparatus is divided into different functional modules to implement all or some of the foregoing described functions. In addition, the transaction processing apparatus provided in the embodiments of this application belongs to the same concept as that of the transaction processing method. For an implementation process of the transaction processing apparatus, refer to the method embodiment, and details are not described herein again.

An embodiment of this application further provides an electronic device (such as computer device), including a processor and a memory, the memory being configured to store at least one computer program, and the at least one computer program being loaded and executed by the processor, to implement the transaction processing method in the embodiments of this application.

In some embodiments, the computer program involved in the embodiments of this application may be deployed to be executed on a computer device, or deployed to be executed on a plurality of computer devices at the same location, or deployed to be executed on a plurality of computer devices that are distributed in a plurality of locations and interconnected by using a wired network or wireless network, and the plurality of computer devices that are distributed in the plurality of locations and interconnected by using the wired network or wireless network may form a blockchain system.

Figure 12:
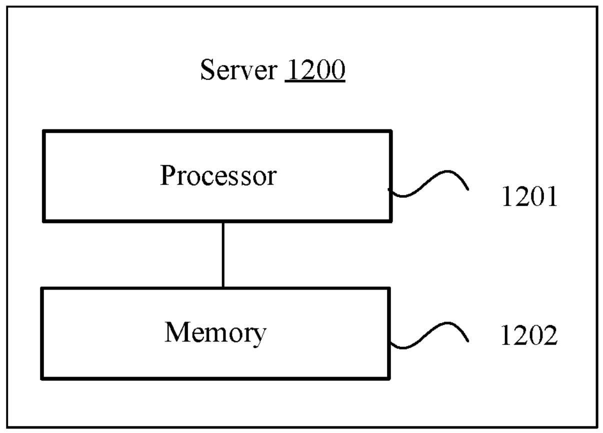
FIG. 12 is a schematic structural diagram of a server according to an embodiment of this application.

An example in which the computer device is a server is used. FIG. 12 is a schematic structural diagram of a server according to an embodiment of this application. The server 1200 may vary greatly due to different configurations or different performance, and may include one or more central processing units (CPUs) 1201 and one or more memories 1202. The memory 1202 stores at least one computer program. The at least one computer program is loaded and executed by the processor 1201 to implement the transaction processing method provided in the foregoing method embodiments. Certainly, the server may also include a wired or wireless network interface, a keyboard, an input/output interface and other components to facilitate input/output. The server may also include other components for implementing device functions. Details are not described herein.

An embodiment of this application further provides a non-transitory computer-readable storage medium, applicable to a computer device and storing at least one computer program, the at least one computer program being loaded and executed by a processor, to implement the transaction processing method in the embodiments of this application.

The embodiments of this application provide a computer program product, including a computer program or instruction, and the computer program or instruction is stored in a computer-readable storage medium. A processor of a computer device reads the computer program or instruction from the computer-readable storage medium, and executes the computer program or instruction, to cause the computer device to perform the transaction processing method provided in the embodiments of this application.

Those of ordinary skill in the art may understand that all or part of the steps of implementing the foregoing embodiments may be implemented by hardware, or may be implemented by a program instructing related hardware. The program may be stored in a computer-readable storage medium. The storage medium mentioned may be a read-only memory, a magnetic disk or an optical disc.

It may be understood that, the embodiments of this application involve related data such as user information, and when the embodiments of this application are applied to a specific product or technology, user permission or consent needs to be obtained, and collection, use and processing of the related data need to comply with related laws, regulations and standard of related nations and regions.

The foregoing descriptions are embodiments of this application, but are not intended to limit this application. Any modification, equivalent replacement, or improvement made within the spirit and principle of this application shall fall within the protection scope of this application.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

As used herein, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit. The division of the foregoing functional modules is merely used as an example for description when the systems, devices, and apparatus provided in the foregoing embodiments performs transaction determination and/or transaction processing. In practical application, the foregoing functions may be allocated to and completed by different functional modules according to requirements, that is, an inner structure of a device is divided into different functional modules to implement all or a part of the functions described above.

What is claimed is:

1. A transaction processing method for a database system, performed by a first electronic device of a plurality of electronic devices, the method comprising:

determining a concurrent transaction of a target transaction, the concurrent transaction and the target transaction include a read-write operation acting on a same variable, and the target transaction is a transaction to be committed;

storing, as a hash table in an internal memory of the first electronic device, a read set of the target transaction, a write set of the concurrent transaction, a write set of the target transaction, and a read set of the concurrent transaction;

obtaining, according to the hash table stored in the internal memory, a first intersection between the read set of the target transaction and the write set of the concurrent transaction;

obtaining, according to the hash table stored in the internal memory, a second intersection between the write set of the target transaction and the read set of the concurrent transaction;

in accordance with a determination that at least one of the first intersection and the second intersection is a non-empty data set, determining that the target transaction conflicts with the concurrent transaction;

determining, based on a version change count of the same variable on which the target transaction and the concurrent transaction act and a target variable list, a data anomaly type, the target variable list including the same variable on which the target transaction and the concurrent transaction act;

obtaining a first conflict cycle graph that represents an association between the concurrent transaction and the target transaction, the conflict cycle graph including a plurality of vertices representing transaction identifiers corresponding to transactions and a plurality of edges representing an association between the transactions and variables on which a read-write operation corresponding to the transactions acts;

determining a transaction to be rolled back from the target transaction and the concurrent transaction;

obtaining, for the target transaction and the concurrent transaction, a global commit timestamp generated by a global timestamp generating cluster, wherein the global commit timestamp is a timestamp identifier that is (a) globally unique across the plurality of electronic devices, (b) monotonically increasing, and (c) indicative of a chronological order in which all transactions are globally committed;

rolling back the transaction, including coordinating rollback and commit by applying (i) the global commit timestamp so as to reflect relationships between transactions according to the chronological order in which the transactions are globally committed and (ii) a two-phase commit (2PC) protocol, wherein an electronic device of the plurality of electronic devices is a coordinator in the 2PC protocol and remaining electronic devices of the plurality of electronic devices are participants in the 2PC protocol;

after the rolling back the transaction, generating an updated conflict cycle graph, including deleting a variable on which the transaction acts and a corresponding read-write operation from the initial conflict cycle graph;

determining, according to the updated conflict cycle, that the target transaction no longer conflicts with the concurrent transaction; and in accordance with the determination that the target transaction no longer conflicts with the concurrent transaction, merging the target transaction and the concurrent transaction to obtain a merged transaction.

2. The method according to claim 1, wherein the determining the transaction to be rolled back from the target transaction and the concurrent transaction comprises:

determining, based on transaction priorities, a transaction with the lowest transaction priority of the target transaction and the concurrent transaction as the transaction to be rolled back.

3. The method according to claim 2, the method further comprising: before determining the transaction with the lowest transaction priority according to one of:

when a processing duration of the target transaction or the concurrent transaction is less than processing durations of other transactions, designating the target transaction or the concurrent transaction as the transaction with the lowest transaction priority; or when the target transaction or the concurrent transaction is a read transaction, designating the target transaction or the concurrent transaction as the transaction with the lowest transaction priority;

when the target transaction or the concurrent transaction is a write transaction and the processing duration of the target transaction or the concurrent transaction is less than a reference duration, designating the target transaction or the concurrent transaction as the transaction with the lowest transaction priority; and when the quantity of variables on which the target transaction or the concurrent transaction acts is greater than the quantity of variables on which the other transactions act, designating the target transaction or the concurrent transaction as the transaction with the lowest transaction priority.

4. The method according to claim 1, further comprising:

transforming the first conflict cycle graph to obtain a second conflict cycle graph, wherein vertices in the second conflict cycle graph are used to represent variables in a plurality of different versions, and edges in the second conflict cycle graph are used to represent version changes between the variables and variables on which a same transaction acts; and transforming the second conflict cycle graph to obtain a target conflict cycle graph.

5. The method according to claim 4, wherein the transforming the first conflict cycle graph to obtain a second conflict cycle graph comprises:

splitting edges of the first conflict cycle graph, to obtain the variables in the plurality of different versions; and using the variables in the plurality of different versions as vertices, adding an edge between vertices corresponding to a same variable in adjacent versions, and adding an edge between vertices corresponding to variables on which a same transaction acts, to obtain the second conflict cycle graph.

6. The method according to claim 4, wherein the transforming the second conflict cycle graph to obtain the target conflict cycle graph comprises:

merging vertices corresponding to the variables on which the same transaction acts in the second conflict cycle graph, and determining a transaction identifier corresponding to the same transaction as a merged vertex;

adding an edge between adjacent vertices of the merged second conflict cycle graph, to obtain a third conflict cycle graph;

when two adjacent vertices of the third conflict cycle graph comprise variables in a same version, merging the two adjacent vertices, and deleting the variables in the same version in the merged vertex, to obtain the target conflict cycle graph; and when two adjacent vertices of the third conflict cycle graph comprise a same variable in different versions, merging the two adjacent vertices, to obtain the target conflict cycle graph.

7. The method according to claim 1, the method further comprising:

when the first intersection is the non-empty data set, performing incremental processing on the quantity of directed edges between the target transaction and the concurrent transaction and adding variables in the first intersection to the target variable list, and when the first intersection comprises variables in different versions, performing incremental processing on the version change count, the quantity of the directed edges being used for indicating whether the target transaction and the concurrent transaction conflict with each other;

when the second intersection is the non-empty data set, performing incremental processing on the quantity of the directed edges and adding variables in the second intersection to the target variable list, and when the second intersection comprises variables in different versions, performing incremental processing on the version change count; and when a third intersection is the non-empty data set, determining the data anomaly type based on a commit state of the concurrent transaction, wherein the third intersection is an intersection between the write set of the target transaction and the write set of the concurrent transaction.

8. The method according to claim 1, wherein the determining the data anomaly type comprises:

determining an affiliation type based on a target read-write operation in the target transaction and the concurrent transaction acting on the same variable;

determining a sub-type in the affiliation type based on the affiliation type and the target variable list; and determining the data anomaly type based on at least one of the sub-type in the affiliation type, the version change count, and the target read-write operation.

9. The method according to claim 8, wherein the determining the affiliation type based on a target read-write operation in the target transaction and the concurrent transaction acting on the same variable comprises one of:

determining the affiliation type as a write anomaly type when the target read-write operation in the target transaction and the concurrent transaction meets a write anomaly condition, wherein that the write anomaly condition is met means that the target read-write operation comprises a first designated quantity of write operations acting on a same variable in different versions;

determining the affiliation type as a read anomaly type when the target read-write operation does not meet the write anomaly condition and meets a read anomaly condition, wherein that the read anomaly condition is met means that the target read-write operation comprises a read operation and a write operation acting on a same variable in a same version; or determining the affiliation type as an intersect anomaly type when the target read-write operation meets neither of the write anomaly condition and the read anomaly condition and meets an intersect anomaly condition, wherein that the intersect anomaly condition is met means that the target read-write operation comprises a read operation and a write operation acting on a same variable in different versions.

10. The method according to claim 8, wherein the determining the sub-type in the affiliation type based on the affiliation type and the target variable list comprises one of:

determining the sub-type in the affiliation type as a single-meta data anomaly when the quantity of variables in the target variable list is a second designated quantity;

determining the sub-type in the affiliation type as a double-meta data anomaly when the quantity of variables in the target variable list is a third designated quantity; or determining the sub-type in the affiliation type as a multi-meta data anomaly when the quantity of variables in the target variable list is a fourth designated quantity, wherein the fourth designated quantity is different from each of the second designated quantity and the third designated quantity.

11. The method according to claim 8, wherein when the affiliation type is a write anomaly type and the sub-type is a single-meta data anomaly, the determining the data anomaly type based on at least one of the sub-type in the affiliation type, the version change count, and the target read-write operation comprises one of:

determining, when the version change count is a second designated quantity, the data anomaly type as a lost self-update anomaly based on the write anomaly type and the single-meta data anomaly;

determining, when the version change count is a third designated quantity and the target read-write operation is a fifth designated quantity of write operations, the data anomaly type as a full write anomaly based on the write anomaly type and the single-meta data anomaly; and determining, when the version change count is the third designated quantity and the target read-write operation is a first designated quantity of write operations and a sixth designated quantity of read operations, the data anomaly type as a lost update anomaly based on the write anomaly type and the single-meta data anomaly.

12. The method according to claim 8, wherein:

the affiliation type is a write anomaly type;

the sub-type is a double-meta data anomaly; and the version change count is a second designated quantity; and determining the data anomaly type based on at least one of the sub-type in the affiliation type, the version change count, and the target read-write operation comprises one of:

determining, when the target read-write operation meets a first condition and a second condition, the data anomaly type as a read-write skew anomaly based on the write anomaly type, the double-meta data anomaly, and the second designated quantity, wherein that the first condition is met means that the target read-write operation comprises a write operation and a read operation acting on a first variable in different versions, and that the second condition is met means that the target read-write operation comprises a first designated quantity of write operations acting on a second variable in different versions;

determining, when the target read-write operation meets a third condition and the second condition, the data anomaly type as a rewrite skew anomaly based on the write anomaly type, the double-meta data anomaly, and the second designated quantity, wherein that the third condition is met means that the target read-write operation comprises a write operation and a read operation acting on the first variable in a same version; or determining, when the target read-write operation meets a fourth condition and the second condition, the data anomaly type as a full write skew anomaly based on the write anomaly type, the double-meta data anomaly, and the second designated quantity, wherein that the fourth condition is met means that the target read-write operation comprises the first designated quantity of write operations acting on the first variable in different versions.

13. The method according to claim 8, wherein:

the affiliation type is a read anomaly type;

the sub-type is a single-meta data anomaly; and the version change count is a second designated quantity; and determining the data anomaly type based on at least one of the sub-type in the affiliation type, the version change count, and the target read-write operation comprises one of:

determining, when the target read-write operation comprises a first designated quantity of read operations and a sixth designated quantity of write operations acting on a same variable, the data anomaly type as a non-repeatable read anomaly based on the read anomaly type, the single-meta data anomaly, and the second designated quantity; or determining, when the target read-write operation comprises the first designated quantity of write operations and the sixth designated quantity of read operations acting on a same variable, the data anomaly type as an intermediate read anomaly based on the read anomaly type, the single-meta data anomaly, and the second designated quantity.

14. The method according to claim 8, wherein:

the affiliation type is a read anomaly type; and the sub-type is a double-meta data anomaly; and determining the data anomaly type based on at least one of the sub-type in the affiliation type, the version change count, and the target read-write operation comprises one of:

determining, when the version change count is a seventh designated quantity, the data anomaly type as a write read skew anomaly based on the read anomaly type and the double-meta data anomaly; or determining, when the version change count is a second designated quantity, the data anomaly type as a read skew anomaly based on the read anomaly type and the double-meta data anomaly.

15. The method according to claim 8, wherein determining the data anomaly type based on at least one of the sub-type in the affiliation type, the version change count, and the target read-write operation comprises:

determining the data anomaly type as a write skew anomaly when the affiliation type is an intersect anomaly type, the sub-type is a double-meta data anomaly, and the version change count is a second designated quantity.

16. The method according to claim 8, wherein determining the data anomaly type based on at least one of the sub-type in the affiliation type, the version change count, and the target read-write operation comprises one of:

determining the data anomaly type as a stepped write anomaly when the affiliation type is a write anomaly type and the sub-type is a multi-meta data anomaly;

determining the data anomaly type as a stepped read anomaly when the affiliation type is a read anomaly type and the sub-type is the multi-meta data anomaly; or determining the data anomaly type as a stepped intersect anomaly when the affiliation type is an intersect anomaly type and the sub-type is the multi-meta data anomaly.

17. A first electronic device, of a plurality of electronic devices, for processing transactions of a database system, the first electronic device comprising:

one or more processors; and memory storing one or more programs, the one or more programs comprising instructions that, when executed by the one or more processors, cause the one or more processors to perform operations comprising:

determining a concurrent transaction of a target transaction, the concurrent transaction and the target transaction include a read-write operation acting on a same variable, and the target transaction is a transaction to be committed;

storing, as a hash table in an internal memory of the first electronic device, a read set of the target transaction, a write set of the concurrent transaction, a write set of the target transaction, and a read set of the concurrent transaction;

obtaining, according to the hash table stored in the internal memory, a first intersection between the read set of the target transaction and the write set of the concurrent transaction;

obtaining, according to the hash table stored in the internal memory, a second intersection between the write set of the target transaction and the read set of the concurrent transaction;

in accordance with a determination that at least one of the first intersection and the second intersection is a non-empty data set, determining that the target transaction conflicts with the concurrent transaction;

determining, based on a version change count of the same variable on which the target transaction and the concurrent transaction act and a target variable list, a data anomaly type, the target variable list including the same variable on which the target transaction and the concurrent transaction act;

obtaining a first conflict cycle graph that represents an association between the concurrent transaction and the target transaction, the conflict cycle graph including a plurality of vertices representing transaction identifiers corresponding to transactions and a plurality of edges representing an association between the transactions and variables on which a read-write operation corresponding to the transactions acts;

determining a transaction to be rolled back from the target transaction and the concurrent transaction;

obtaining, for the target transaction and the concurrent transaction, a global commit timestamp generated by a global timestamp generating cluster, wherein the global commit timestamp is a timestamp identifier that is (a) globally unique across the plurality of electronic devices, (b) monotonically increasing, and (c) indicative of a chronological order in which all transactions are globally committed;

rolling back the transaction, including coordinating rollback and commit by applying (i) the global commit timestamp so as to reflect relationships between transactions according to the chronological order in which the transactions are globally committed and (ii) a two-phase commit (2PC) protocol, wherein an electronic device of the plurality of electronic devices is a coordinator in the 2PC protocol and remaining electronic devices of the plurality of electronic devices are participants in the 2PC protocol;

after the rolling back the transaction, generating an updated conflict cycle graph, including deleting a variable on which the transaction acts and a corresponding read-write operation from the initial conflict cycle graph;

determining, according to the updated conflict cycle, that the target transaction no longer conflicts with the concurrent transaction; and in accordance with the determination that the target transaction no longer conflicts with the concurrent transaction, merging the target transaction and the concurrent transaction to obtain a merged transaction.

18. A non-transitory computer-readable storage medium, storing one or more instructions, the one or more instructions, when executed by one or more processors of a first electronic device of a plurality of electronic devices, cause the first electronic device to perform operations for processing transactions of a database system, the operations comprising:

determining a concurrent transaction of a target transaction, the concurrent transaction and the target transaction include a read-write operation acting on a same variable, and the target transaction is a transaction to be committed;

storing, as a hash table in an internal memory of the first electronic device, a read set of the target transaction, a write set of the concurrent transaction, a write set of the target transaction, and a read set of the concurrent transaction;

obtaining, according to the hash table stored in the internal memory, a first intersection between the read set of the target transaction and the write set of the concurrent transaction;

obtaining, according to the hash table stored in the internal memory, a second intersection between the write set of the target transaction and the read set of the concurrent transaction;

in accordance with a determination that at least one of the first intersection and the second intersection is a non-empty data set, determining that the target transaction conflicts with the concurrent transaction;

determining, based on a version change count of the same variable on which the target transaction and the concurrent transaction act and a target variable list, a data anomaly type, the target variable list including the same variable on which the target transaction and the concurrent transaction act;

obtaining a first conflict cycle graph that represents an association between the concurrent transaction and the target transaction, the conflict cycle graph including a plurality of vertices representing transaction identifiers corresponding to transactions and a plurality of edges representing an association between the transactions and variables on which a read-write operation corresponding to the transactions acts;

determining a transaction to be rolled back from the target transaction and the concurrent transaction;

obtaining, for the target transaction and the concurrent transaction, a global commit timestamp generated by a global timestamp generating cluster, wherein the global commit timestamp is a timestamp identifier that is (a) globally unique across the plurality of electronic devices, (b) monotonically increasing, and (c) indicative of a chronological order in which all transactions are globally committed;

rolling back the transaction, including coordinating rollback and commit by applying (i) the global commit timestamp so as to reflect relationships between transactions according to the chronological order in which the transactions are globally committed and (ii) a two-phase commit (2PC) protocol, wherein an electronic device of the plurality of electronic devices is a coordinator in the 2PC protocol and remaining electronic devices of the plurality of electronic devices are participants in the 2PC protocol;

after the rolling back the transaction, generating an updated conflict cycle graph, including deleting a variable on which the transaction acts and a corresponding read-write operation from the initial conflict cycle graph;

determining, according to the updated conflict cycle, that the target transaction no longer conflicts with the concurrent transaction; and in accordance with the determination that the target transaction no longer conflicts with the concurrent transaction, merging the target transaction and the concurrent transaction to obtain a merged transaction.

* * * * *